US012670230B2

(12) United States Patent
Wu et al.

(10) Patent No.: US 12,670,230 B2
(45) Date of Patent: Jun. 30, 2026

(54) METHOD AND DEVICE FOR HOMOGENIZATION CONVERSION OF SAME INDEX DETECTED BY DIFFERENT EQUIPMENT, AND ELECTRONIC EQUIPMENT

(71) Applicant: WEST CHINA HOSPITAL, SICHUAN UNIVERSITY, Chengdu City (CN)

(72) Inventors: Yongkang Wu, Chengdu City (CN); Yuxiang Wu, Chengdu City (CN)

(73) Assignee: WEST CHINA HOSPITAL, SICHUAN UNIVERSITY, Sichuan (CN)

( * ) Notice: Subject to any disclaimer, the term of this patent is extended or adjusted under 35 U.S.C. 154(b) by 724 days.

(21) Appl. No.: 18/003,654

(22) PCT Filed: Sep. 29, 2022

(86) PCT No.: PCT/CN2022/122661
§ 371 (c)(1),
(2) Date: Dec. 28, 2022

(87) PCT Pub. No.: WO2023/151286
PCT Pub. Date: Aug. 17, 2023

(65) Prior Publication Data
US 2023/0273973 A1 Aug. 31, 2023

(51) Int. Cl.
*G06F 17/18* (2006.01)
*G01N 21/17* (2006.01)

(52) U.S. Cl.
CPC ............. *G06F 17/18* (2013.01); *G01N 21/17* (2013.01)

(58) Field of Classification Search
CPC .......... G06F 17/18; G06F 17/10; G06F 17/00; G01N 21/17; G01N 21/00; G16H 10/40; G16H 10/00
See application file for complete search history.

(56) References Cited

U.S. PATENT DOCUMENTS 3,769,843 A * 11/1973 Sperberg .................. G01N 3/56
73/146
4,852,025 A 7/1989 Herpichbohm
(Continued)

FOREIGN PATENT DOCUMENTS

CN       101059335 A    10/2007
CN       103822887 A     5/2014
(Continued)

OTHER PUBLICATIONS

Supplementary Search Report for Corresponding Chinese Application No. CN202210701442.3, 2022 (1 page).
(Continued)

*Primary Examiner* — Mohamed Charioui
(74) *Attorney, Agent, or Firm* — Clark & Elbing LLP

(57) ABSTRACT

An index homogenization conversion method, a method and device for homogenization conversion of same index detected by different equipment, electronic equipment, and a comparison sample determination method are provided. The index homogenization conversion method includes acquiring an actually-measured signal value; determining corresponding concentration thereof on a first standard curve; obtaining a first target arc-line segment thereof according to first and second end points of the first standard curve, and obtaining a second target-arc line segment thereof according to the first end point and an end point of test sample on the first standard curve; obtaining a third target arc-line segment according to first and second end points of the second standard curve; determining an arc length equa-
(Continued)

Acquiring an actually measured signal value    S510

Determining a corresponding concentration of the actually measured signal value on a first standard curve    S520

Obtaining a first target arc line segment of the first standard curve according to a first end point of the first standard curve and a second end point of the first standard curve, and obtaining a second target arc line segment of the first standard curve according to the first end point of the first standard curve and an end point corresponding to the test sample on the first standard curve    S530

Obtaining a third target arc line segment of a second standard curve according to a first end point of the second standard curve and a second end point of the second standard curve    S540

Determining an arc length equation of a fourth target arc line segment according to the first target arc line segment, the second target arc line segment, and the third target arc line segment    S550

Determining a homogenization concentration corresponding to the actually measured signal value according to the arc length equation of the fourth target arc line segment    S580 tion of a fourth target arc-line segment according to the first, second and third target arc-line segments; and determining a homogenization concentration corresponding to the actually-measured signal value according to the arc length equation.

16 Claims, 9 Drawing Sheets

(56)                     References Cited

U.S. PATENT DOCUMENTS

| | | | | |
|---|---|---|---|---|
| 2005/0137806 A1* | 6/2005 | Kutsyy | ............. | G06F 18/24143 |
| | | | | 424/9.1 |
| 2008/0013083 A1 | 1/2008 | Kirk et al. | | |
| 2008/0013088 A1 | 1/2008 | Hessert et al. | | |
| 2011/0054861 A1 | 3/2011 | Lane | | |
| 2014/0377766 A1 | 12/2014 | Hopper | | |
| 2016/0097676 A1 | 4/2016 | Kurasawa et al. | | |
| 2021/0208059 A1 | 7/2021 | Sun et al. | | |

FOREIGN PATENT DOCUMENTS

| | | | |
|---|---|---|---|
| CN | 106053727 | A | 10/2016 |
| CN | 106755537 | A | 5/2017 |
| CN | 107657134 | A | 2/2018 |
| CN | 107850422 | A | 3/2018 |
| CN | 109444060 | A | 3/2019 |
| CN | 109632753 | A | 4/2019 |
| CN | 109709062 | A | 5/2019 |
| CN | 109741804 | A | 5/2019 |
| CN | 110082345 | A | 8/2019 |
| CN | 110210006 | A | 9/2019 |
| CN | 110609002 | A | 12/2019 |
| CN | 111289459 | A | 6/2020 |
| CN | 111368420 | A | 7/2020 |
| CN | 111973196 | A | 11/2020 |
| CN | 112213443 | A | 1/2021 |
| CN | 113034620 | A | 6/2021 |
| CN | 113130008 | A | 7/2021 |
| CN | 113252632 | A | 8/2021 |
| CN | 113283677 | A | 8/2021 |
| CN | 113450883 | A | 9/2021 |
| CN | 113450910 | A | 9/2021 |
| CN | 113820260 | A | 12/2021 |
| CN | 114166768 | A | 3/2022 |
| CN | 114265367 | A | 4/2022 |
| CN | 114324218 | A | 4/2022 |
| CN | 114415095 | A | 4/2022 |
| DE | 3617161 | A1 | 11/1987 |
| EP | 3032430 | A1 | 6/2016 |
| KR | 2017-0010264 | A | 1/2017 |
| WO | WO-2013/113072 | A1 | 8/2013 |

OTHER PUBLICATIONS

First Office Action for Chinese Application No. CN202210131273.4, dated Mar. 18, 2022 (7 pages) (English translation included).
First Office Action for Chinese Application No. CN202210701442.3, dated Aug. 3, 2022 (10 pages) (English translation included).
First Office Action for Chinese Application No. CN202210978315.8, dated Sep. 20, 2022 (11 pages) (English translation included).
First Search of Chinese Application No. CN202210131273.4, 2022 (3 pages).
First Search of Chinese Application No. CN202210701442.3, 2022 (2 pages).
First Search of Chinese Application No. CN202210978315.8, 2022 (1 page).
Notification to Grant Patent Right for Invention for Chinese Application No. CN202210131273.4, dated Apr. 1, 2022 (3 pages) (English translation included).
Notification to Grant Patent Right for Invention for Chinese Application No. CN202210701442.3, dated Aug. 22, 2022 (3 pages) (English translation included).
PCT Application No. PCT/CN2022/122661, English Translation of International Search Report (ISR) and Written Opinion mailed Jan. 4, 2023 (18 pages).
CN Application No. CN2022109783158, English Translation of Supplemental Search Report issued Jan. 30, 2023 (4 pages).
CN Application No. CN2022109783158, English Translation of Notification to Grant Patent Right, issued Feb. 16, 2023 (2 pages).
EP Application No. EP22925644.1, Office Action dated Sep. 4, 2024 (3 pages).
EP Application No. 22925644.1, Supplemental Search Report issued Sep. 16, 2024 (10 pages).

* cited by examiner

1000

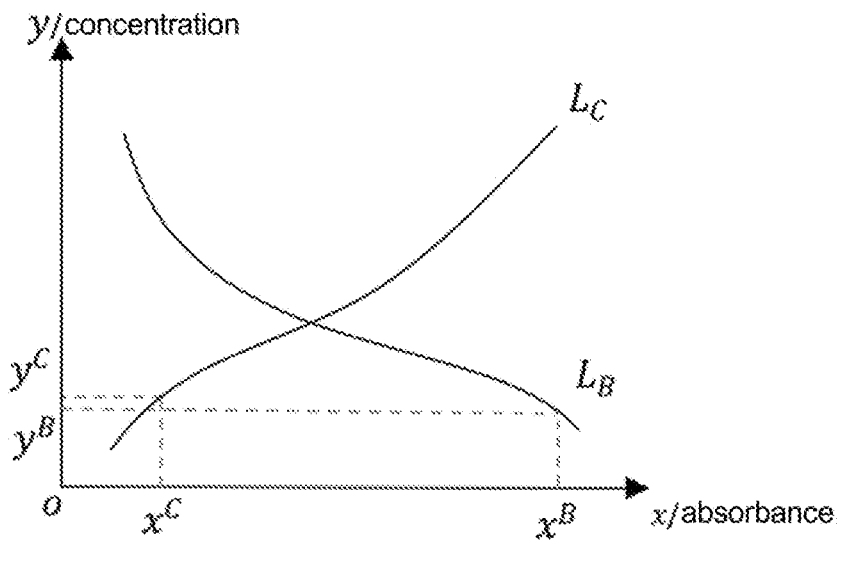

FIG. 15

```
┌─────────────────────────────┐
│   Acquiring an actually      │ ⌇ 1610
│   measured absorbance        │
└─────────────────────────────┘
              │
              ▼
┌─────────────────────────────┐
│ Determining a first target   │ ⌇ 1620
│ line segment corresponding   │
│ to the actually measured     │
│ absorbance                   │
└─────────────────────────────┘
              │
              ▼
┌─────────────────────────────┐
│ Determining a homogenization │
│ proportion according to an   │
│ absorbance at the first end  │ ⌇ 1630
│ point of the first target    │
│ line segment, an absorbance  │
│ at the second end point of   │
│ the first target line        │
│ segment, and the actually    │
│ measured absorbance          │
└─────────────────────────────┘
              │
              ▼
┌─────────────────────────────┐
│ Determining a second target  │ ⌇ 1640
│ line segment corresponding   │
│ to the first target line     │
│ segment                      │
└─────────────────────────────┘
              │
              ▼
┌─────────────────────────────┐
│ Determining the              │
│ homogenization concentration │
│ corresponding to the actually│
│ measured absorbance according│
│ to the concentration at the  │ ⌇ 1650
│ first end point of the second│
│ target line segment, the     │
│ concentration at the second  │
│ end point of the second      │
│ target line segment, and the │
│ homogenization proportion    │
└─────────────────────────────┘
```

FIG. 16

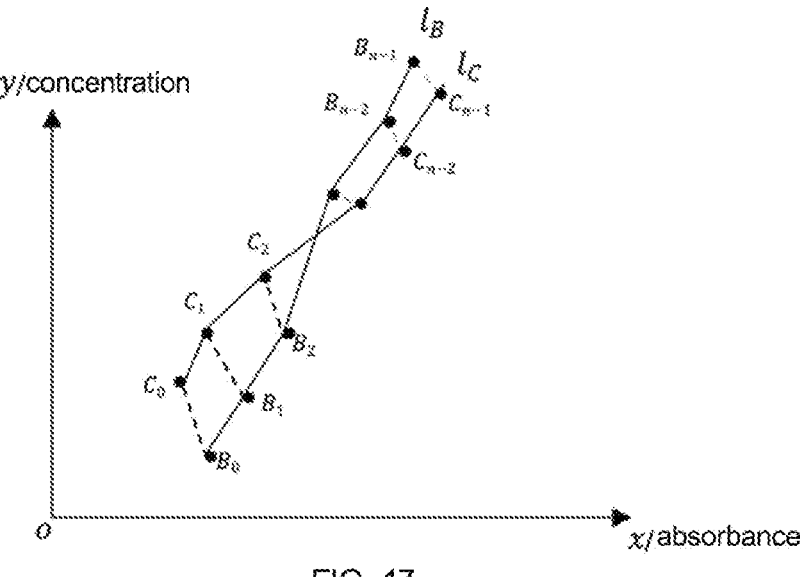
FIG. 17
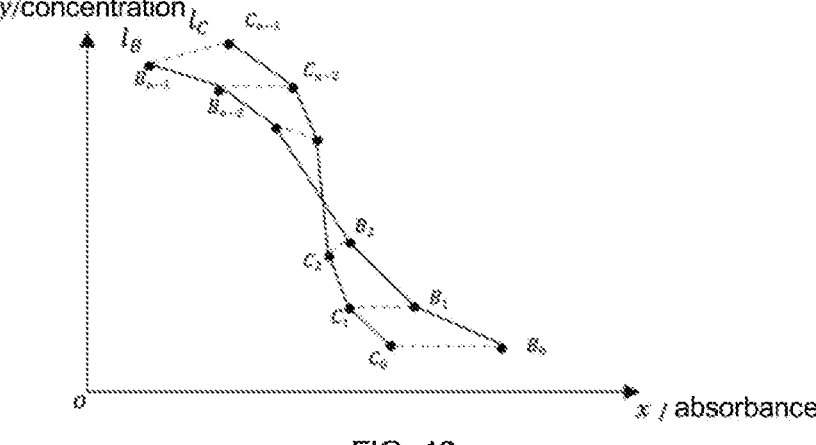
FIG. 18
FIG. 19

METHOD AND DEVICE FOR HOMOGENIZATION CONVERSION OF SAME INDEX DETECTED BY DIFFERENT EQUIPMENT, AND ELECTRONIC EQUIPMENT

TECHNICAL FIELD

The present disclosure relates to the technical field of detection equipment, and in particular to a method and a device for homogenization conversion of the same index detected by different equipment, and electronic equipment.

BACKGROUND ART

Accurate test results are of vital importance to diagnosis and prognosis judgment of clinicians on diseases. However, in an actual medical process, detection results obtained by detecting the same index of the same patient may be quite different, which is mainly caused by the following two situations: one situation is that two kinds of equipment are used in the same laboratory for detection, and results of the same test index are quite different; and the other situation is that laboratories of two different medical institutions respectively use different detection equipment to detect the same test index, and detection results also may be quite different.

For two pieces of detection equipment, in both situations in the above, there may be the problem that the detection results are different. From the perspective of clinicians, it is desirable that detection results of the same index of the same sample are always relatively consistent, that is, the detection results fluctuate within a quite small range, and such very small fluctuation range does not affect the diagnosis or prognosis judgment of the clinicians on diseases, that is, homogenization and comparability of the detection results are realized.

However, this is quite difficult for clinical testing practice. In domestic and even global clinical test world, different detection methods, different detection equipment, different detection reagents, different detection personnel and so on can be used for the same index, and such numerous factors and errors will cause quite different results obtained by detecting the same index by different detection equipment. However, both the country and the industry require different medical institutions to realize homogenization of detection results as much as possible on the basis of clinician approval, so that the results are comparable, only reports detected by institutions that realize the detection result homogenization can be approved and used by doctors of different medical institutions, and the patients do not need to have repeated test, which not only can save the patients' time, but also can avoid repeated test so as to save medical resources and national medical insurance funds. However, realizing detection result homogenization is a huge scientific problem and faces great challenges.

If mutual conversion between the detection results of two different pieces of detection equipment can be realized so as to make the two detection results tend to be consistent, the homogenization of the detection results can be achieved, but a conversion method for detection results of different detection equipment for the same index of the same sample is lacked in the market at present, i.e., a method for making results of two pieces of detection equipment for the same index of the same sample tend to be consistent is lacked.

In addition, in the medical scenarios, in order to reduce the difference between detection results of two different pieces of detection equipment as much as possible, some comparison samples often need to be selected, and then simultaneously detected by the two pieces of detection equipment, and the obtained detection results can be used for multiple applications. In particular, these comparison samples can be used for realizing homogenization conversion of detection index results of different detection equipment for the same sample.

In addition, in the related art at present, when selecting the comparison samples, a relatively random selection mode is adopted, and scientific selection of the comparison samples cannot be realized.

SUMMARY

The present disclosure provides a method and a device for homogenization conversion of the same index detected by different equipment, and electronic equipment, for realizing homogenization of detection results of different detection equipment. The present disclosure provides a conversion method based on two modes of arc line and straight line, to realize homogenization conversion of detection results of different detection equipment.

Some embodiments in one aspect of the present disclosure provide an index homogenization conversion method, which may include: acquiring an actually measured signal value, wherein the actually measured signal value is a signal value obtained by detecting a test sample by test equipment; determining a corresponding concentration of the actually measured signal value on a first standard curve, wherein the first standard curve is a preset concentration-signal value relationship curve of the test equipment; obtaining a first target arc line segment of the first standard curve according to a first end point of the first standard curve and a second end point of the first standard curve, and obtaining a second target arc line segment of the first standard curve according to the first end point of the first standard curve and an end point corresponding to the test sample on the first standard curve, wherein the first end point and the second end point of the first standard curve are concentrations-signal values corresponding to different comparison samples; obtaining a third target arc line segment of a second standard curve according to a first end point of the second standard curve and a second end point of the second standard curve, wherein the second standard curve is a preset concentration-signal value relationship curve of the reference equipment, the first end point of the second standard curve and the first end point of the first standard curve are concentrations-signal values corresponding to the same comparison sample, and the second end point of the second standard curve and the second end point of the first standard curve are concentrations-signal values corresponding to the same comparison sample; determining an arc length equation of a fourth target arc line segment according to the first target arc line segment, the second target arc line segment, and the third target arc line segment, wherein the fourth target arc line segment is an arc line segment from the first end point of the second standard curve to the corresponding end point of the test sample on the second standard curve; and determining a homogenization concentration corresponding to the actually measured signal value according to the arc length equation of the fourth target arc line segment.

In the embodiments of the present disclosure, different detection equipment are test equipment and reference equipment respectively, and the test sample is detected by the test equipment, to obtain the signal value and the concentration corresponding to the test sample, so as to determine coordinates of the test sample on the first standard curve, then the first target arc line segment connecting the first end point and the second end point on the first standard curve is obtained according to the first end point and the second end point of the first standard curve, and the second target arc line segment connecting the first end point and the coordinates of the test sample on the first standard curve is obtained according to the first end point and the coordinates of the test sample on the first standard curve, and by the same reasoning, the third target arc line segment on the second standard curve is obtained. Further, as the first end point on the first standard curve and the first end point on the second standard curve are both different detection results obtained from the same comparison sample, the two points have a correspondence, and similarly, the second end point on the first standard curve is corresponding to the second end point on the second standard curve.

After the first target arc line segment, the second target arc line segment, and the third target arc line segment are obtained, an arc length equation of the fourth target arc line segment is established according to similar principle, wherein the fourth target arc line segment is an arc line from the first end point of the second standard curve to the corresponding end point of the test sample on the second standard curve. Then the arc length equation of the fourth target arc line segment is solved, to determine the concentration of the test sample on the second standard curve, i.e., to determine the homogenization concentration corresponding to the actually measured signal value, finally achieving homogenization of the detection results of different detection equipment.

As a possible implementation mode, the determining an arc length equation of a fourth target arc line segment according to the first target arc line segment, the second target arc line segment, and the third target arc line segment may include: determining a length relationship between an arc length of the fourth target arc line segment and an arc length of each target arc line segment according to respective arc lengths of the first target arc line segment, the second target arc line segment, and the third target arc line segment; and determining an arc length calculation equation of the fourth target arc line segment based on an arc length calculation formula and the length relationship.

As a possible implementation mode, the determining a homogenization concentration corresponding to the actually measured signal value according to the arc length calculation equation of the fourth target arc line segment may include: processing the arc length equation by a compound Simpson integral formula and a bisection method, and determining the homogenization concentration corresponding to the actually measured signal value.

In the embodiments of the present disclosure, by processing the arc length equation by the compound Simpson integral formula and the bisection method, the calculation amount can be reduced, further improving the data processing efficiency.

As a possible implementation mode, the processing the arc length equation by a compound Simpson integral formula and a bisection method and determining the homogenization concentration corresponding to the actually measured signal value may include: converting the arc length equation by the compound Simpson integral formula to obtain a target integral equation; and solving the target integral equation by the bisection method, to determine the homogenization concentration corresponding to the actually measured signal value.

As a possible implementation mode, before determining the arc length equation of the fourth target arc line segment based on the arc length calculation formula and the length relationship, the method further may include: determining a step value of the compound Simpson integral formula according to the first end point of the first standard curve, the second end point of the first standard curve, the end point corresponding to the test sample on the first standard curve, the first end point of the second standard curve, and the second end point of the second standard curve.

In the embodiments of the present disclosure, the step value is determined through the first end point of the first standard curve, the second end point of the first standard curve, the end point corresponding to the test sample on the first standard curve, the first end point of the second standard curve, and the second end point of the second standard curve, so as to reduce an error of finally acquired homogenization concentration.

As a possible implementation mode, after determining a homogenization concentration corresponding to the actually measured signal value according to the arc length equation of the fourth target arc line segment, the method further may include: judging whether a difference between the homogenization concentration and the concentration at the first end point or the second end point of the second standard curve is less than a preset threshold, and calibrating, if yes, the homogenization concentration according to a formula:

$$x_E^{B''} = \frac{x_{j-1}^B - x_{E'}^B}{2} \text{ or } X_E^{B''} = \frac{-x_j^B + x_{E'}^B}{2},$$

where $$x_E^{B''}$$

is the homogenization concentration after calibration, $$x_j^B$$

is the concentration at the first end point of the second target arc line segment, $$x_{j-1}^B$$

is the concentration at the second end point of the second target arc line segment, and $$x_{E'}^B$$

is the homogenization concentration.

In the embodiments of the present disclosure, whether the difference between the homogenization concentration and the concentration at the first end point or the second end point of the second standard curve is judged, so that when the concentration difference is less than the preset threshold, the homogenization concentration is calibrated through the formula:

$$x_E^{B''} = \frac{x_{j-1}^B - x_{E'}^B}{2} \text{ or } X_E^{B''} = \frac{-x_j^B + x_{E'}^B}{2},$$

enabling that the final numerical value of the homogenization concentration is controllable, thus improving the data
operation and processing efficiency, and avoiding occur-
rence of a situation such as a calculation result is an infinite
decimal or the number of iterations is excessive, etc. which
results in equipment calculation breakdown.

As a possible implementation mode, before acquiring the
actually measured signal value, the method further may
include determining the number of comparison samples
through following steps of: determining a plurality of first
comparison samples corresponding to the test equipment
according to the first standard curve and a preset error
condition, wherein the first standard curve is used to char-
acterize relationship between the signal value of the test
equipment and the concentration, and the signal value
includes absorbance and luminescence value; determining a
plurality of second comparison samples corresponding to the
reference equipment according to the second standard curve
and the preset error condition, wherein the second standard
curve is used to characterize the relationship between the
signal value of the reference equipment and the concentra-
tion, and the signal value includes absorbance and lumines-
cence value; and determining a plurality of final comparison
samples according to the plurality of first comparison
samples and the plurality of second comparison samples.

In the embodiments of the present disclosure, the plurality
of first comparison samples corresponding to the test equip-
ment are determined according to the first standard curve
and the preset error condition, and the plurality of second
comparison samples corresponding to the reference equipment are determined according to the second standard curve
and the preset error condition; and further, a plurality of final
comparison samples are determined according to the plu-
rality of first comparison samples and the plurality of second
comparison samples, thus achieving the scientific selection
of the comparison samples.

As a possible implementation mode, the determining a
plurality of first comparison samples corresponding to the
test equipment according to the first standard curve and a
preset error condition may include: acquiring the lowest
concentration value detectable by the test equipment; deter-
mining the starting coordinate point on the first standard
curve according to the lowest concentration value detectable
by the test equipment; determining, as the first comparison
samples, the corresponding comparison samples determined
by the starting coordinate point on the first standard curve;
determining a plurality of first coordinate points on the first
standard curve based on the preset error condition and the
starting coordinate point on the first standard curve, wherein
on the first standard curve, any coordinate point between two
adjacent first coordinate points satisfies the preset error
condition, the preset error condition being $$\left| \frac{x_C - x_D}{x_C} \right| \le d,$$ where C is this coordinate point, D is a coordinate point
having the same signal value as this coordinate point, on a
line segment constituted by the two adjacent first coordinate
points, $x_C$ is a concentration value of the coordinate point C,
$x_D$ is a concentration value of the coordinate point D, and d is a preset error value; and determining, as the first com-
parison samples, all comparison samples corresponding to
the plurality of first coordinate points.

In the embodiments of the present disclosure, the preset
error condition is used to define the difference between the
concentration at the coordinate point on the line segment
formed between two adjacent first coordinate points and the
concentration at corresponding coordinate point on the stan-
dard curve, to ensure that each selected first comparison
sample is within an allowable error range, i.e., meeting an
allowable error condition, and realizing the scientific selec-
tion of the first comparison samples.

As a possible implementation mode, the determining a
plurality of first coordinate points on the first standard curve
based on the preset error condition and the starting coordi-
nate point on the first standard curve may include: deter-
mining the plurality of first coordinate points on the first
standard curve sequentially through a preset matlab algo-
rithm based on the preset error condition and the starting
coordinate point on the first standard curve.

In the embodiments of the present disclosure, based on the
preset error condition and the corresponding starting coor-
dinate point, rapid and accurate sampling of each coordinate
point is realized by the matlab algorithm, further improving
the accuracy and scientificity of the selected first comparison
samples.

As a possible implementation mode, the comparison
sample determination method further may include: acquir-
ing the highest concentration value detectable by the test
equipment as the starting coordinate point; determining
another coordinate point on the first standard curve accord-
ing to the starting coordinate point of the highest concen-
tration value detectable by the test equipment; and deter-
mining, as the first comparison sample, the comparison
sample corresponding to the another coordinate point on the
first standard curve.

In the embodiments of the present disclosure, by deter-
mining another coordinate point corresponding to the high-
est concentration value detectable by the test equipment, and
also determining, as the first comparison sample, the com-
parison sample corresponding to the determined another
coordinate point, the first comparison samples are deter-
mined in sequence, increasing the number thereof.

As a possible implementation mode, the determining a
plurality of second comparison samples corresponding to the
reference equipment according to the second standard curve
and the preset error condition may include: acquiring the
lowest concentration value detectable by the reference
equipment; determining a starting coordinate point on the
second standard curve according to the lowest concentration
value detectable by the reference equipment; determining a
comparison sample corresponding to the starting coordinate
point on the second standard curve, as the second compari-
son sample; and determining the plurality of second coor-
dinate points on the second standard curve based on the
preset error condition and the starting coordinate point on
the second standard curve, wherein on the second standard
curve, any coordinate point between two adjacent second
coordinate points satisfies the preset error condition, the
preset error condition being $$\left| \frac{x_E - x_F}{x_E} \right| \le d,$$

where E is this coordinate point, F is a coordinate point having the same signal value as this coordinate point, on a line segment constituted by the two adjacent second coordinate points, $x_E$ is a concentration value of the coordinate point E, $x_F$ is a concentration value of the coordinate point F, and d is a preset error value; and determining all comparison samples corresponding to the plurality of second coordinate points, as the second comparison samples.

In the embodiments of the present disclosure, the preset error condition is used to define the difference between the concentration at the coordinate point on the line segment formed by two adjacent second coordinate points and the concentration at corresponding coordinate point on the standard curve, to ensure that each selected second comparison sample is within an allowable error range, i.e., meeting an allowable error condition, and realizing the scientific selection of the second comparison samples.

As a possible implementation mode, the determining a plurality of second coordinate points on the second standard curve based on the preset error condition and the starting coordinate point on the second standard curve may include: determining the plurality of second coordinate points on the second standard curve by a preset matlab algorithm, based on the preset error condition and the starting coordinate point on the second standard curve.

In the embodiments of the present disclosure, based on the preset error condition and the corresponding starting coordinate point, rapid and accurate sampling of each coordinate point is realized by the matlab algorithm, further improving the accuracy and scientificity of the selected second comparison samples.

As a possible implementation mode, the comparison sample determination method further may include: acquiring the highest concentration value detectable by the reference equipment, as the starting coordinate point; determining another coordinate point on the second standard curve according to the starting coordinate point of the highest concentration value detectable by the reference equipment; and determining the comparison sample corresponding to the determined another coordinate point on the second standard curve, as the second comparison sample.

In the embodiments of the present disclosure, by determining the highest concentration value detectable by the reference equipment as the starting point to calculate and obtain the corresponding another coordinate point, and also determining the comparison sample corresponding to the determined another coordinate point as the second comparison sample, the second comparison samples are determined in sequence, increasing the number thereof.

As a possible implementation mode, the determining a plurality of final comparison samples according to the plurality of first comparison samples and the plurality of second comparison samples may include: determining identical comparison samples in the plurality of first comparison samples and the plurality of comparison samples; performing de-duplication on the identical comparison samples to obtain a plurality of de-duplicated comparison samples; detecting the plurality of de-duplicated comparison samples by the test equipment or the reference equipment, to obtain detection curves corresponding to the plurality of de-duplicated comparison samples; determining similar comparison samples according to the detection curves, wherein coordinate points of the similar comparison samples on the detection curves are adjacent coordinate points, and a difference between concentrations at the adjacent coordinate points is within a preset error range; and performing de-duplication on the similar comparison samples to obtain a plurality of final comparison samples.

In the embodiments of the present disclosure, by performing the de-duplication on the identical comparison samples, and by performing the de-duplication on the similar comparison samples, sufficient de-duplication on the comparison samples is achieved, thereby achieving reduction of the comparison samples.

Some other embodiments in one aspect of the present disclosure provide a homogenization conversion device, which may include: an acquiring module, configured to acquire an actually measured signal value, wherein the actually measured signal value is a signal value obtained by detecting a test sample by test equipment; a determination module, configured to determine a concentration of the actually measured signal value on a first standard curve, wherein the first standard curve is a preset concentration-signal value relationship curve of the test equipment; the acquiring module is further configured to obtain a first target arc line segment of the first standard curve according to a first end point of the first standard curve and a second end point of the first standard curve, and obtain a second target arc line segment of the first standard curve according to the first end point of the first standard curve and concentration-signal value corresponding to the test sample on the first standard curve, the first end point and the second end point of the first standard curve being end points corresponding to different comparison samples; and obtain a third target arc line segment of a second standard curve according to a first end point of the second standard curve and a second end point of the second standard curve, wherein the second standard curve is a preset concentration-signal value relationship curve of the reference equipment, the first end point of the second standard curve and the first end point of the first standard curve are concentrations-signal values corresponding to the same comparison sample, and the second end point of the second standard curve and the second end point of the first standard curve are concentrations-signal values corresponding to the same comparison sample; and the determination module is further configured to determine an arc length calculation equation of a fourth target arc line segment according to the first target arc line segment, the second target arc line segment, and the third target arc line segment, wherein the fourth target arc line segment is an arc line segment from the first end point of the second standard curve to corresponding end point of the test sample on the second standard curve; and determine a homogenization concentration corresponding to the actually measured signal value according to the arc length equation of the fourth target arc line segment.

As a possible implementation mode, the determination module further may be configured to: determine a length relationship between an arc length of the fourth target arc line segment and an arc length of each target arc line segment according to respective arc lengths of the first target arc line segment, the second target arc line segment, and the third target arc line segment; and determine the arc length equation of the fourth target arc line segment based on the arc length calculation formula and the length relationship.

As a possible implementation mode, the index homogenization conversion device further may include: a comparison sample number determination device, configured to determine the number of comparison samples before acquiring the actually measured signal value, and the comparison sample number determination device may include:

a first determination module, configured to determine a plurality of first comparison samples corresponding to the test equipment according to the first standard curve and a preset error condition, wherein the first standard curve is used to characterize relationship between the signal value of the test equipment and the concentration, and the signal value includes absorbance, luminescence value, etc.;

a second determination module, configured to determine a plurality of second comparison samples corresponding to the reference equipment according to the second standard curve and the preset error condition, wherein the second standard curve is used to characterize relationship between the signal value of the reference equipment and the concentration, and the signal value includes absorbance and luminescence value; and a third determination module, configured to determine a plurality of final comparison samples according to the plurality of first comparison samples and the plurality of second comparison samples.

Some embodiments in another aspect of the present disclosure provide a method for homogenization conversion of the same index detected by different equipment, which may include: acquiring an actually measured absorbance, wherein the actually measured absorbance is absorbance obtained by detecting a test sample by the test equipment; determining a first target line segment corresponding to the actually measured absorbance, wherein the first target line segment is a line segment on a first straight line segment combination, the first straight line segment combination is a line segment combination obtained by detecting a plurality of comparison samples by the test equipment, and each coordinate point is corresponding to the absorbance and concentration of one comparison sample; determining a homogenization proportion according to an absorbance at the first end point of the first target line segment, an absorbance at the second end point of the first target line segment, and the actually measured absorbance, wherein the homogenization proportion is used for calculation to convert the concentration corresponding to the actually measured absorbance into a homogenization concentration; determining a second target line segment corresponding to the first target line segment, wherein the second target line segment is a line segment on a second straight line segment combination, the second straight line segment combination is a line segment combination obtained by detecting a plurality of comparison samples by the reference equipment, and each coordinate point is corresponding to the absorbance and concentration of one comparison sample; and determining the homogenization concentration corresponding to the actually measured absorbance according to the concentration at the first end point of the second target line segment, the concentration at the second end point of the second target line segment, and the homogenization proportion.

In the embodiments of the present disclosure, different pieces of detection equipment are test equipment and reference equipment respectively, and a detection result of the reference equipment is taken as a benchmarking result, i.e., after homogenization conversion of the same detection index of the same sample, it is achieved that the detection result of the test equipment tends to be consistent with that of the reference equipment. The detection result of the detection equipment that needs to be homogenized is concentration, the test equipment corresponds to the first straight line segment combination, the reference equipment corresponds to the second straight line segment combination, and various points on the line segment on the first straight line segment combination and on the line segment on the second straight line segment combination have a one-to-one correspondence therebetween.

After acquiring the actually measured absorbance, which specific line segment (namely, the first target line segment) where the absorbance is located is determined first according to the absorbance value, and then according to the absorbances at two end points of the specific line segment, a proportional relationship (namely, a homogenization proportion) between the concentration corresponding to the actually measured absorbance and concentrations at the two end points can be determined; since the second target line segment and the first target line segment have a correspondence therebetween, on the second target line segment, the concentrations at the two end points and the homogenization concentration also comply to the homogenization proportion relationship (Note: the homogenization proportions corresponding to different points on different line segments are different, and need to be calculated according to the actually measured result). Further, based on the homogenization proportion and the concentrations at the two end points on the second target line segment, determination of the homogenization concentration can be achieved, and homogenization of detection results of different detection equipment finally can be achieved.

As a possible implementation mode, before acquiring the actually measured absorbance, the method further may include: acquiring a plurality of comparison samples; detecting a first absorbance of each comparison sample by the test equipment, and determining a first concentration of each comparison sample based on the first absorbance of each comparison sample and a preset first standard curve, wherein the preset first standard curve is used to characterize a relationship between the absorbance of the test equipment and the concentration; generating the first straight line segment combination according to the first absorbance of each comparison sample and the first concentration of each comparison sample; detecting a second absorbance of each comparison sample by the reference equipment, and determining a second concentration of each comparison sample based on the second absorbance of each comparison sample and a preset second standard curve, wherein the preset second standard curve is used to characterize a relationship between the absorbance of the reference equipment and the concentration; and generating the second straight line segment combination according to the second absorbance of each comparison sample and the second concentration of each comparison sample.

In the embodiments of the present disclosure, on different detection equipment, the same comparison samples are detected for the absorbance respectively, and in conjunction with the preset standard curve, the concentrations corresponding to the detected absorbances are determined, and finally, in conjunction with the absorbances and the concentrations corresponding to the absorbances, it is realized that corresponding points of the same batch of comparison samples on respective line segments in the straight line segment combination obtained by different detection equipment have a one-to-one correspondence.

As a possible implementation mode, the generating the first straight line segment combination according to the first absorbance of each comparison sample and the first concentration of each comparison sample may include: determining a first coordinate point corresponding to each comparison sample according to the first absorbance and the first concentration of each comparison sample; determining an arrangement order of the first coordinate points corresponding to respective comparison samples; and connecting the first coordinate points corresponding to the respective comparison samples in sequence according to the arrangement order of the first coordinate points corresponding to the respective comparison samples, to generate the first straight line segment combination.

In the embodiments of the present disclosure, by connecting the first coordinate points corresponding to respective comparison samples in sequence according to the arrangement order of the first coordinate points corresponding to the respective comparison samples, a plurality of straight line segments can be generated, and effective generation of the first straight line segment combination is realized.

As a possible implementation mode, the generating the second straight line segment combination according to the second absorbance of each comparison sample and the second concentration of each comparison sample may include: determining a second coordinate point corresponding to each comparison sample according to the second absorbance and the second concentration of each comparison sample; determining an arrangement order of the second coordinate points corresponding to respective comparison samples, the arrangement order of the second coordinate points being corresponding to the arrangement order of the first coordinate points; and connecting the second coordinate points corresponding to the respective comparison samples in sequence according to the arrangement order of the second coordinate points corresponding to the respective comparison samples, to generate the second straight line segment combination.

In the embodiments of the present disclosure, by connecting the second coordinate points corresponding to the respective comparison samples in sequence according to the arrangement order of the second coordinate points corresponding to the respective comparison samples, a plurality of straight line segments can be generated, and effective generation of the second straight line segment combination is realized.

As a possible implementation mode, the first end point of the first target line segment and the first end point of the second target line segment may characterize the absorbance and the concentration of the same comparison sample; and the second end point of the first target line segment and the second end point of the second target line segment may characterize the absorbance and the concentration of the same comparison sample.

In the embodiments of the present disclosure, based on the foregoing generation modes of the first straight line segment combination and the second straight line segment combination, two samples respectively corresponding to the second target line segment and the first target line segment are the same samples. By that analogy, various points on the first target line segment and various points on the second target line segment have a correspondence therebetween, so as to realize quick determination of relationship between various points.

As a possible implementation mode, the first absorbances of the respective comparison samples may be absorbances detected by a competitive method or a non-competitive method; and the second absorbances of the respective comparison samples may be absorbances detected by a competitive method or a non-competitive method.

In the embodiments of the present disclosure, when determining the first straight line segment combination and the second straight line segment combination, the detected absorbance can be detected by the competitive method, and also can be detected by the non-competitive method, to realize effective detection of the absorbance.

As a possible implementation mode, the homogenization proportion is expressed as:

$$r = \frac{x_E^C - x_{j-1}^C}{x_j^C - x_{j-1}^C},$$

where $$x_E^C$$

is the actually measured absorbance, $$x_{j-1}^C$$

is the absorbance at the first end point of the first target line segment, and $$x_j^C$$

is the absorbance at the second end point of the first target line segment.

In the embodiments of the present disclosure, through the above homogenization proportion, the relationship between the actually measured absorbance and the absorbances at two end points of the first target line segment can be characterized, and as the absorbance and the concentration also have a correspondence therebetween, the above homogenization proportion also can characterize the relationship between the concentration of the actually measured absorbance and the concentrations at two end points of the first target line segment.

As a possible implementation mode, the homogenization concentration is expressed as:

$$y_{E'}^B = y_{j-1}^B + r(y_j^B - y_{j-1}^B),$$

where r is the homogenization proportion, $$y_{j-1}^B$$

is concentration at the first end point of the second target line segment, and $$y_j^B$$

is concentration at the second end point of the second target line segment.

In the embodiments of the present disclosure, by detecting the result of the comparison sample by the test equipment, the homogenization proportions of different actually measured results are calculated, to realize effective determination of the homogenization concentration with the homogenization proportion calculated from the above actually measured result and the concentrations at the two end points of the second target line segment.

As a possible implementation mode, before acquiring the actually measured absorbance, the method further may include determining the number of comparison samples through following steps of: determining a plurality of first comparison samples corresponding to the test equipment according to the first standard curve and a preset error condition, wherein the first standard curve is used to characterize the relationship between the absorbance of the test equipment and the concentration; determining a plurality of second comparison samples corresponding to the reference equipment according to the second standard curve and the preset error condition, wherein the second standard curve is used to characterize the relationship between the absorbance of the reference equipment and the concentration; and determining a plurality of final comparison samples according to the plurality of first comparison samples and the plurality of second comparison samples.

In the embodiments of the present disclosure, the plurality of first comparison samples corresponding to the test equipment are determined according to the first standard curve and the preset error condition, and the plurality of second comparison samples corresponding to the reference equipment are determined according to the second standard curve and the preset error condition; and further, a plurality of final comparison samples are determined according to the plurality of first comparison samples and the plurality of second comparison samples, thus achieving the scientific selection of the comparison samples.

Some other embodiments in another aspect of the present disclosure provide a device for homogenization conversion of the same index detected by different equipment, which may include: various functional modules for realizing the method for homogenization conversion of the same index detected by different equipment in any possible implementation mode in the one aspect as mentioned in the above.

Some other embodiments in another aspect of the present disclosure provide a device for homogenization conversion of the same index detected by different equipment, which may include: an acquiring module, configured to acquire an actually measured absorbance, wherein the actually measured absorbance is absorbance obtained by detecting a test sample by test equipment; a processing module, configured to: determine a first target line segment corresponding to the actually measured absorbance, wherein the first target line segment is a line segment on a first straight line segment combination, the first straight line segment combination is a line segment combination obtained by detecting a plurality of comparison samples by the test equipment, and each coordinate point is corresponding to the absorbance and concentration of one comparison sample; determine a homogenization proportion according to an absorbance at the first end point of the first target line segment, an absorbance at the second end point of the first target line segment, and the actually measured absorbance, wherein the homogenization proportion is used to convert a concentration corresponding to the actually measured absorbance into a homogenization concentration; determine a second target line segment corresponding to the first target line segment, wherein the second target line segment is a line segment on a second straight line segment combination, the second straight line segment combination is a line segment combination obtained by detecting a plurality of comparison samples by reference equipment, and each coordinate point is corresponding to absorbance and concentration of one comparison sample; and determine homogenization concentration corresponding to the actually measured absorbance according to a concentration at the first end point of the second target line segment, a concentration at the second end point of the second target line segment, and the homogenization proportion.

As a possible implementation mode, the device for homogenization conversion of the same index detected by different equipment further may include: a comparison sample number determination device, configured to determine the number of comparison samples before acquiring the actually measured absorbance, and the comparison sample number determination device may include:

a first determination module, configured to determine a plurality of first comparison samples corresponding to the test equipment according to the first standard curve and a preset error condition, wherein the first standard curve is used to characterize the relationship between the absorbance of the test equipment and the concentration;

a second determination module, configured to determine a plurality of second comparison samples corresponding to the reference equipment according to the second standard curve and the preset error condition, wherein the second standard curve is used to characterize the relationship between the absorbance of the reference equipment and the concentration; and a third determination module, configured to determine the plurality of final comparison samples according to the plurality of first comparison samples and the plurality of second comparison samples.

Some further embodiments of the present disclosure provide a computer-readable storage medium, wherein the computer-readable storage medium stores computer programs, and when the computer programs are run by the computer, the index homogenization conversion method according to any possible implementation mode in the one aspect as mentioned above and/or the method for homogenization conversion of the same index detected by different equipment according to any possible implementation mode in the another aspect as mentioned above is executed.

Some further embodiments of the present disclosure provide electronic equipment, which may include: a processor, and a memory in communication with the processor, wherein the memory stores instructions executable by the processor, and the instructions are executed by the processor, so as to enable the processor to execute the index homogenization conversion method according to any possible implementation mode in the one aspect as mentioned above and/or the method for homogenization conversion of the same index detected by different equipment according to any possible implementation mode in the another aspect as mentioned above.

BRIEF DESCRIPTION OF DRAWINGS

In order to more clearly illustrate technical solutions of embodiments of the present disclosure, drawings which need to be used in the embodiments of the present disclosure will be introduced briefly below. It should be understood that the drawings below merely show some embodiments of the present application for patent, therefore, they should not be considered as limitation on the scope, and those ordinarily skilled in the art still could obtain other relevant drawings according to these drawings, without using any creative efforts.

FIG. 15 is a fourth exemplary diagram of standard curves of absorbance and concentration provided in an embodiment in another aspect of the present disclosure;

FIG. 16 is a flowchart of a method for homogenization conversion of the same index detected by different equipment provided in an embodiment in another aspect of the present disclosure;

FIG. 17 is a first exemplary diagram of a straight line segment combination of absorbance and concentration provided in an embodiment in another aspect of the present disclosure;

FIG. 18 is a second exemplary diagram of a straight line segment combination of absorbance and concentration provided in an embodiment in another aspect of the present disclosure;

FIG. 19 is a third exemplary diagram of a straight line segment combination of absorbance and concentration provided in an embodiment in another aspect of the present disclosure;

Figure 1:
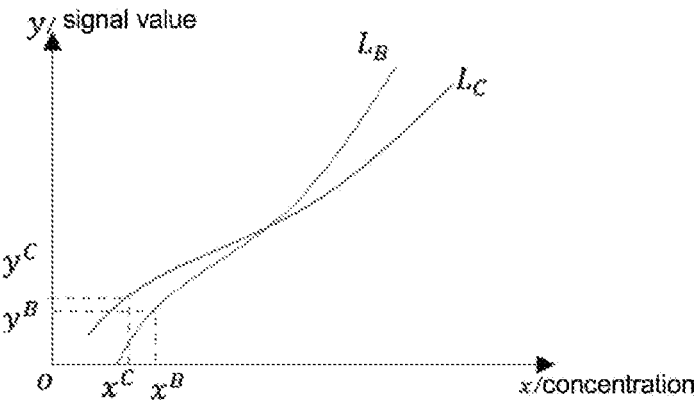
FIG. 1 is a first exemplary diagram of standard curves of signal value and concentration provided in an embodiment in one aspect of the present disclosure.

Reference signs: index homogenization conversion device 1000; acquiring module 1010; determination module 1020; calibration module 1030; 1100—comparison sample number determination device; 1110—first determination module; 1120—second determination module; 1130—third determination module; 2400—device for homogenization conversion of the same index detected by different equipment; 2410—acquiring module; 2420—processing module; 2500—electronic equipment; 2510—processor; 2520—memory.

DETAILED DESCRIPTION OF EMBODIMENTS

The technical solutions in the embodiments of the present disclosure will be described below in conjunction with drawings in the embodiments of the present disclosure.

1.1 Index Homogenization Arc Line Conversion Method

An embodiment in one aspect of the present disclosure provides a method for performing homogenization on a result detected by detection equipment involved in a medical scenario, and in the index homogenization conversion method, conversion may be performed based on an arc line segment, therefore, the method for homogenization conversion of the same index detected by different equipment may be an index arc line homogenization conversion method.

Parameters obtained by detecting a sample by the detection equipment include a signal value and a concentration. In an application process, the detection equipment detects the sample to obtain the signal value and the concentration, wherein the concentration is a detection result finally required. The concentration can be calculated through a standard curve of the signal value and the concentration, while the standard curve is preset in each piece of detection equipment, and there is a certain difference between the standard curves in individual pieces of detection equipment.

Exemplarily, for the same sample, signal values and concentrations obtained from detection by different detection equipment are different, but all have certain correspondence. Exemplarily, test equipment 1 detects a sample A to obtain a signal value of 5 and a concentration of 6, and test equipment 2 detects the sample A to obtain a signal value of 8 and a concentration of 15. Although it is the same sample, the signal values and concentrations detected by different detection equipment are different, and the difference between the test results is caused by a variety of factors such as different sensitivity of detection signals, different measurement unit values, and different preset standard curves between various pieces of detection equipment.

In some embodiments, this technical solution also may be applied to the homogenization of detection equipment in other application scenarios, and is not limited to the medical scenario. Correspondingly, the parameters obtained by detecting the sample by the detection equipment are not limited to the signal value and the concentration. That is to say, the inventive concept of the present disclosure can be applied to other detection application scenarios, which also belongs to the scope of protection of the present disclosure.

In addition, a hardware running environment of the technical solution provided in the embodiments of the present disclosure may be detection equipment itself, i.e., as a part of an instrument, the detection equipment itself performs homogenization processing on the detection result of the sample. As another embodiment, the hardware running environment also may be a separate data processing end, the data processing end is configured to perform the homogenization processing on detection results of different detection equipment, and the data processing end may be various kinds of electronic products, which is not limited herein.

Figure 2:
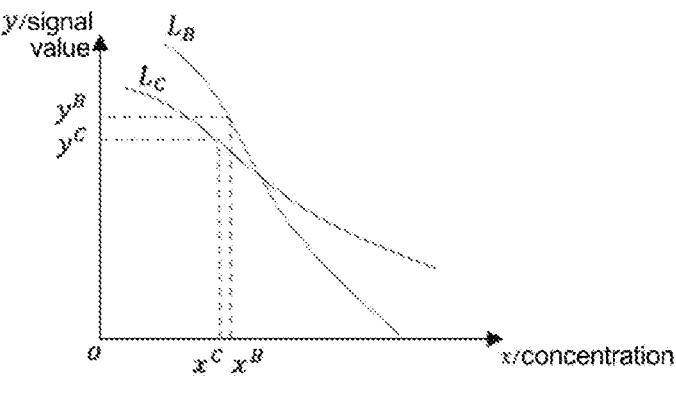
FIG. 2 is a second exemplary diagram of standard curves of signal value and concentration provided in an embodiment in one aspect of the present disclosure.
Figure 3:
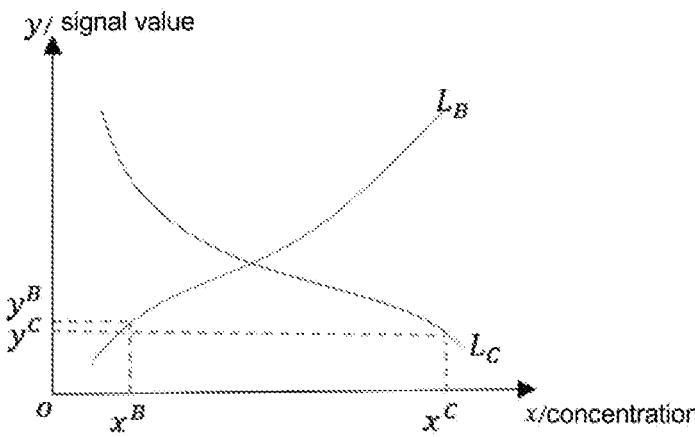
FIG. 3 is a third exemplary diagram of standard curves of signal value and concentration provided in an embodiment in one aspect of the present disclosure.
Figure 4:
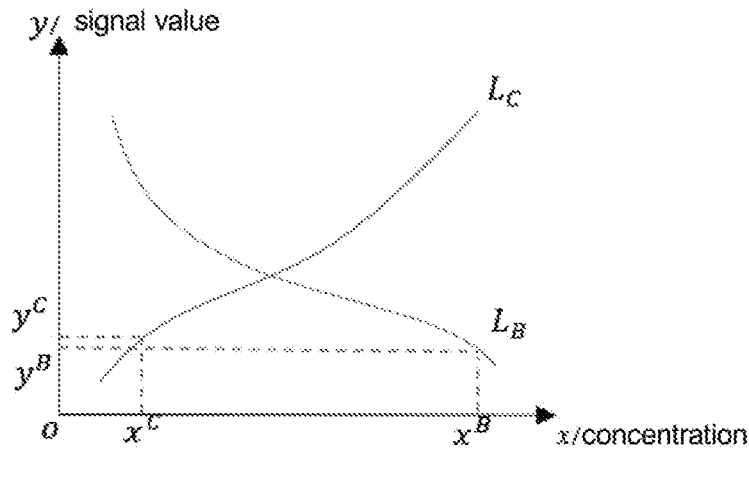
FIG. 4 is a fourth exemplary diagram of standard curves of signal value and concentration provided in an embodiment in one aspect of the present disclosure.

Exemplarily, for the two pieces of detection equipment, one is test equipment, and the other is reference equipment. The same index is detected for the same sample, wherein the signal value detected by the test equipment is $y^C$, the corresponding concentration is $x^C$, the signal value detected by the reference equipment is $y^B$, and the corresponding concentration is $x^B$. The test equipment and the reference equipment both have two detection methods available for selection, i.e., a non-competitive method (two parameters x and y on coordinate axis form a curve of positive correlation) and a competitive method (two parameters x and y on a coordinate axis form a curve of negative correlation). There are in total 4 cases for detecting the same index of the same sample by two pieces of detection equipment:

case 1: both the reference equipment and the test equipment use the non-competitive method, with standard curves of the signal value and concentration obtained as shown in FIG. 1;

case 2: both the reference equipment and the test equipment use the competitive method, with standard curves of the signal value and concentration obtained as shown in FIG. 2;

case 3: the reference equipment uses the non-competitive method, and the test equipment uses the competitive method, with standard curves of the signal value and concentration obtained as shown in FIG. 3; and case 4: the reference equipment uses the competitive method, and the test equipment uses the non-competitive method, with standard curves of the signal value and concentration obtained as shown in FIG. 4.

In the above, in FIG. 1 to FIG. 4, $L_C$ is the standard curve corresponding to the signal value of the test equipment and the concentration, and $L_B$ is the standard curve corresponding to the signal value of the reference equipment and the concentration.

As for the four cases above, the test equipment and the reference equipment detect the same index of the same sample, and the signal values and the concentrations are different no matter whether the same detection method is selected or different detection methods are selected. To realize homogenization of the detection results of the test equipment and the reference equipment for the same index of the same sample, the key is to determine a point on the standard curve of the test equipment, then find a corresponding point on the standard curve of the reference equipment, and consistency, i.e., homogenization, of the results can be realized by converting the two detection results.

Figure 5:
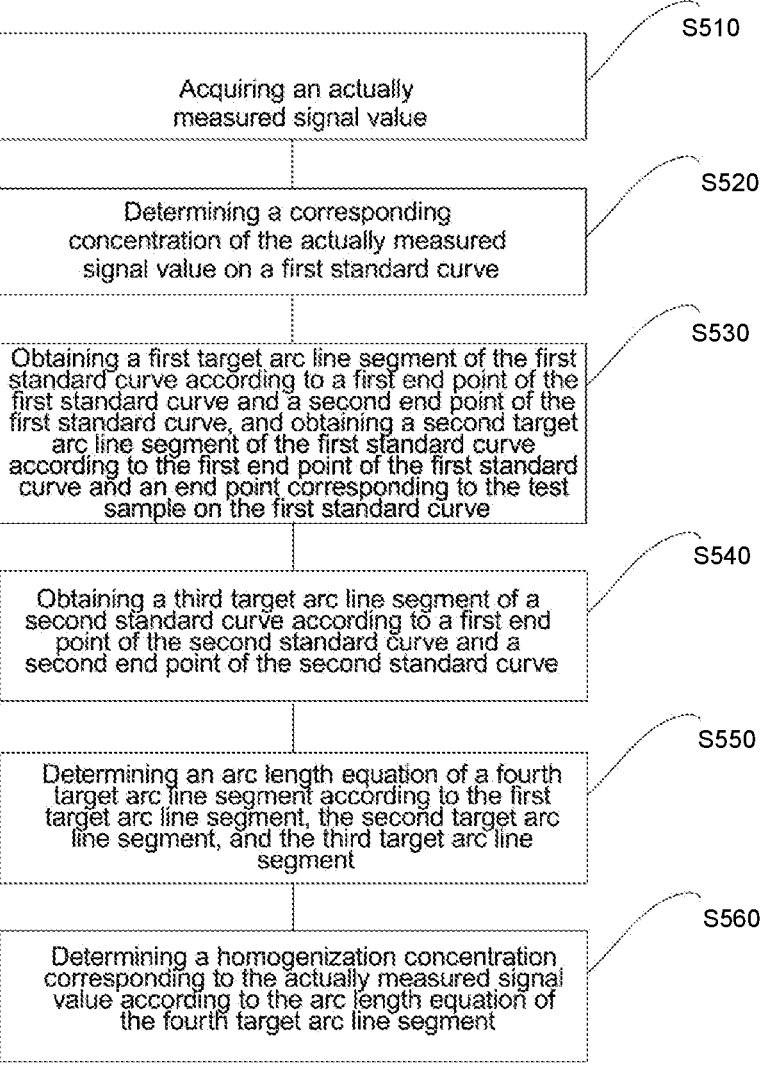
FIG. 5 is a flowchart of an index homogenization conversion method provided in an embodiment in one aspect of the present disclosure.

Based on the above inventive concept, referring to FIG. 5, a flowchart of the index homogenization conversion method provided in an embodiment of the present disclosure, the method includes:

S510, acquiring an actually measured signal value.

In the above, the actually measured signal value is a signal value obtained by detecting a test sample by the test equipment.

In an embodiment, the signal value may be a luminescence value, an absorbance, or the like, which specifically may be determined according to a detection item, and the present disclosure is not limited thereto.

Figure 7:
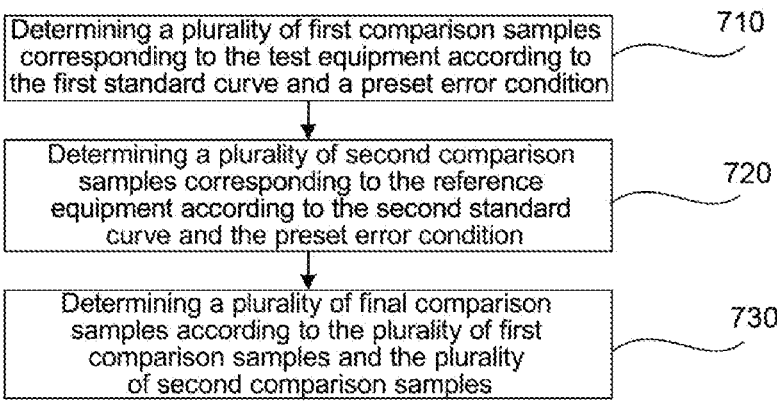
FIG. 7 is a flowchart of a comparison sample determination method provided in an embodiment in one aspect of the present disclosure.
Figure 8:
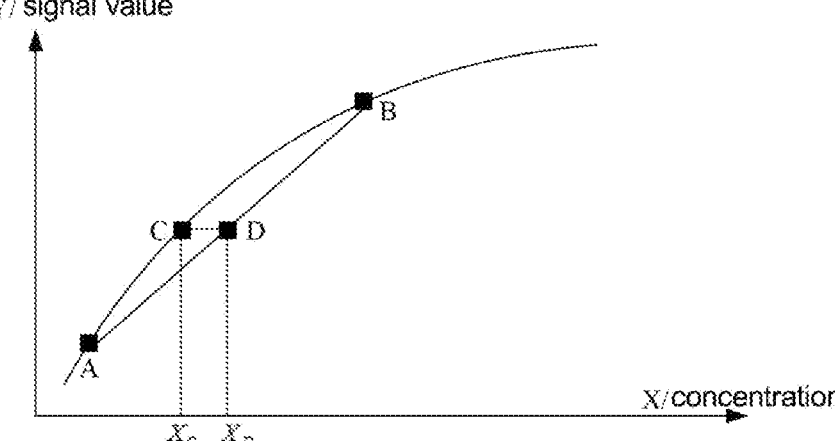
FIG. 8 is an exemplary diagram of a standard curve provided in an embodiment in one aspect of the present disclosure.
Figure 9:
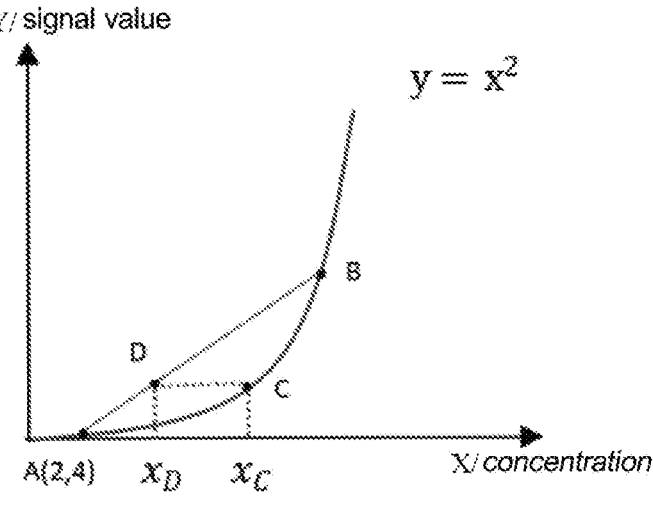
FIG. 9 is an exemplary diagram of a standard curve provided in another embodiment in one aspect of the present disclosure.

As an optional embodiment, before the step S510 of acquiring an actually measured signal value in FIG. 5, the method further may include a step of determining the number of comparison samples, and specifically, reference can be made to the foregoing detailed description of FIG. 7 to FIG. 9.

S520, determining a corresponding concentration of the actually measured signal value on a first standard curve.

In the above, the first standard curve is a preset signal value-concentration relationship curve of the test equipment, and specifically, reference can be made to the foregoing description of the standard curve, which is not repeated herein.

It should be noted that, the actually measured signal value is a signal value obtained by detecting the test sample by the test equipment, and based on this signal value and the first standard curve, the concentration corresponding to this signal value can be obtained.

S530, obtaining a first target arc line segment of the first standard curve according to a first end point of the first standard curve and a second end point of the first standard curve, and obtaining a second target arc line segment of the first standard curve according to the first end point of the first standard curve and an end point corresponding to the test sample on the first standard curve.

In the above, the first end point and the second end point of the first standard curve are concentration and signal value coordinates corresponding to different comparison samples.

S540, obtaining a third target arc line segment of a second standard curve according to a first end point of the second standard curve and a second end point of the second standard curve.

In the above, the second standard curve is a preset concentration-signal value relationship curve of the reference equipment, the first end point of the second standard curve and the first end point of the first standard curve are concentrations-signal values corresponding to the same comparison sample, and the second end point of the second standard curve and the second end point of the first standard curve are concentrations-signal values corresponding to the same comparison sample.

In the present embodiment, the first end point and the second end point of the first standard curve and the first end point and the second end point of the second standard curve in steps S530 and S540 may be determined by the following method, and the method may include:

recording signal values and concentrations of n comparison samples in advance by the reference equipment and the test equipment, and obtaining concentrations-signal values of n end points on the first standard curve and concentrations-signal values of n end points on the second standard curve.

It can be understood that both the first standard curve and the second standard curve are formed by a plurality of different curve functions and intervals corresponding to the respective curve functions. The concentrations-signal values corresponding to end points of the intervals of these curve functions can be selected as various comparison samples.

In the above, various curve functions and corresponding intervals in the standard curve may be acquired according to the description of each interval section of the standard curve in the detection equipment (reference equipment and test equipment) provided by manufacturers, or various curve functions and corresponding intervals in the standard curve may be acquired by an existing comparison sample selection method, for example, a comparison sample determination method and device, storage medium, and electronic equipment in filing No. CN202210701442.3.

After the actually measured signal value and corresponding concentration of the test sample on the first standard curve are determined, the interval where the test sample is located is determined, and the first end point (end point of the interval) and the second end point (end point of the interval) of the first standard curve are determined according to the interval.

Further, according to a mapping relationship between various end points on the first standard curve and the second standard curve, the first end point of the second standard curve can be determined through the first end point of the first standard curve, and the second end point of the second standard curve can be determined through the second end point of the first standard curve.

Figure 6:
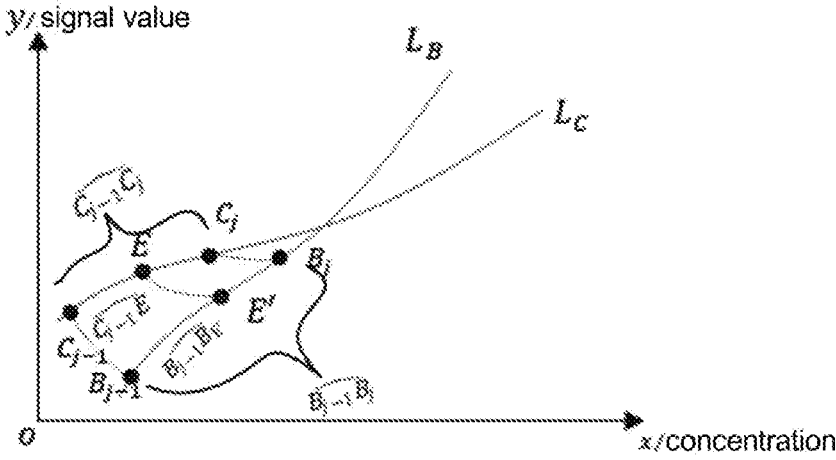
FIG. 6 is a schematic diagram of target arc line segments provided in an embodiment in one aspect of the present disclosure.

Exemplarily, referring to FIG. 6, an implementation process of S530 may be as follows: the actually measured signal value and corresponding concentration of a test sample E fall within an interval of corresponding end point $C_{j-1}$ and end point $C_j$ of a comparison sample $j-1$ and a comparison sample $j$ on a first standard curve $L_C$, therefore, it is determined that $C_{j-1}$ is a first end point of the first standard curve $L_C$, $C_j$ is a second end point of the first standard curve $L_C$, the first standard curve $L_C$ is intercepted according to positions of the first end point and the second end point on the first standard curve $L_C$, to obtain a first target arc line segment $\overset{\frown}{C_{j-1}C_j}$. The first standard curve $L_C$ is intercepted according to the positions of $C_{j-1}$ and E on the first standard curve $L_C$ to obtain a second target arc line segment $\overset{\frown}{C_{j-1}E}$.

An implementation process of S540 may comprises: according to concentrations-signal values of the comparison sample $j-1$ and the comparison sample $j$ on a second standard curve $L_B$, it can be determined that $B_{j-1}$ is a first end point of the second standard curve $L_B$, $B_j$ is a second end point of the second standard curve $L_B$, and a third target arc line segment $\overset{\frown}{B_{j-1}B_j}$ is obtained by intercepting the part from the end point $B_{j-1}$ to the end point $B_j$ on the second standard curve $L_B$.

S550, determining an arc length equation of a fourth target arc line segment according to the first target arc line segment, the second target arc line segment, and the third target arc line segment.

In the above, the fourth target arc line segment is an arc line segment from the first end point of the second standard curve to corresponding end point of the test sample on the second standard curve.

In an embodiment, a specific implementation mode of S550 may comprise: determining a length relationship between an arc length of the fourth target arc line segment and an arc length of each target arc line segment according to respective arc lengths of the first target arc line segment, the second target arc line segment, and the third target arc line segment. The arc length equation of the fourth target arc line segment is determined based on the length calculation formula and the length relationship.

Exemplarily, referring to FIG. 6 again, as the first end point $(B_{j-1})$ of the second standard curve and the first end point $(C_{j-1})$ of the first standard curve are detection results obtained for the same comparison sample $(j-1)$, the second end point $(B_j)$ of the second standard curve and the second end point $(C_j)$ of the first standard curve are detection results obtained for the same comparison sample $(j)$. In this case, it may be considered that various end points on the first target arc line segment $\overset{\frown}{C_{j-1}C_j}$ and various end points on the second target arc line segment $\overset{\frown}{B_{j-1}B_j}$ are in one-to-one correspondence with each other, and change trend of each end point on the target arc line segments is uniform.

Therefore, the following equation of the length relationship between the arc lengths of various target arc line segments can be obtained:

$$r = \frac{l_{\overset{\frown}{C_{j-1}E}}}{l_{\overset{\frown}{C_{j-1}C_j}}} = \frac{l_{\overset{\frown}{B_{j-1}E'}}}{l_{\overset{\frown}{B_{j-1}B_j}}} \tag{1}$$

In the above, E is an end point corresponding to the test sample on the first standard curve, and E' is an end point of the test sample on the second standard curve after homogenization.

According to the arc length calculation formula, the following may be obtained by calculating each arc length:

$$l_{\overset{\frown}{C_{j-1}C_j}} = \int_{x_{j-1}^C}^{x_j^C} \sqrt{1 + [f'(x)]^2} \, dx$$

By varying an upper limit of integral, length of the arc line $\overset{\frown}{C_{j-1}E}$ is obtained $$l_{\overset{\frown}{C_{j-1}E}} = \int_{x_{j-1}^C}^{x_E^C} \sqrt{1 + [f'(x)]^2} \, dx$$

In the above, a function of $\overset{\frown}{C_{j-1}C_j}$ of the first standard curve of the test equipment is recorded as $f(x)$, and a derivative thereof is recorded as $f'(x)$.

By the same reasoning, a function of $\overset{\frown}{B_{j-1}B_j}$ of the second standard curve of the reference equipment is recorded as $g(x)$, and a derivative thereof is recorded as $g'(x)$. It can be obtained that the length of the arc line $\overset{\frown}{B_{j-1}B_j}$ is $$l_{\overset{\frown}{B_{j-1}B_j}} = \int_{x_{j-1}^B}^{x_j^B} \sqrt{1 + [g'(x)]^2} \, dx$$

The length of the arc line $\overset{\frown}{B_{j-1}E'}$ is $$l_{\overset{\frown}{B_{j-1}E'}} = \int_{x_{j-1}^B}^{x_{E'}^B} \sqrt{1 + [g'(x)]^2} \, dx$$

It can be obtained through substitution into the formula (1) for conversion that $$l_{B_{j-1}^{\prime}B_{E^{\prime}}} = n_{B_{j-1}^{\prime}B_j} = \frac{l_{C_{j-1}^{\prime}E} l_{B_{j-1}^{\prime}B_j}}{l_{C_{j-1}^{\prime}C_j}} = \int_{x_{j-1}^B}^{x_{E^{\prime}}^B} \sqrt{1+[g^{\prime}(x)]^2}\, dx \qquad (2)$$

In the above, the formula (2) is the arc length equation of the fourth target arc line segment.

It should be noted that $$x_{j-1}^C$$

is abscissas of the first end point of the first standard curve, and $$x_j^C$$

is abscissas of the second end point of the first standard curve, $$x_{j-1}^B$$

is abscissa of the first end point of the second standard curve, $$x_j^B$$

is abscissa of the second end point of the second standard curve, $$x_E^C$$

is the abscissa of the test sample on the first standard curve, and $$x_E^{B^{\prime}}$$

is the abscissa (the homogenization concentration corresponding to the actually measured signal value) of the test sample on the second standard curve.

S560, determining a homogenization concentration corresponding to the actually measured signal value according to the arc length equation of the fourth target arc line segment.

In an embodiment, a specific implementation process of S560 may comprise: processing the arc length equation of the fourth target arc line segment by a compound Simpson integral formula and a bisection method, and determining the homogenization concentration corresponding to the actually measured signal value.

Specifically, the arc length equation is converted by means of the compound Simpson integral formula to obtain a target integral equation, and the target integral equation is solved by the bisection method, to determine the homogenization concentration corresponding to the actually measured signal value.

It can be understood that, considering that the calculation feasibility of finding an original function of the integral in the arc length formula to perform the integral operation on the integral is relatively low, the arc length equation can be converted by the compound Simpson integral formula in the numerical integration.

Exemplarily, a process of converting the arc length equation by the compound Simpson integral formula is as follows: $\sqrt{1+[f^{\prime}(x)]^2}$ is denoted as F(x), $\sqrt{1+[g^{\prime}(x)]^2}$ is denoted as G(x), $m_C$, $m_B$, and $m_E$ are respectively the division number of small intervals in intervals $$[x_{j-1}^C, x_j^c],$$

and $$[x_{j-1}^B, x_j^B],$$

and $$[x_{j-1}^C, x_E^C],$$

and $$h_C = \frac{x_j^c - x_{j-1}^c}{m_C}, \; h_B = \frac{x_j^B - x_{j-1}^B}{m_B}, \text{ and } h_E = \frac{x_j^c - x_E^c}{m_E}$$

respectively represent step values of corresponding intervals, so that an integral expression corresponding to $l_{C_{j-1}^{\prime}C_j}$ may be:

$$l_{C_{j-1}^{\prime}C_i} = \frac{h_C}{6}\left[F\left(x_{j-1}^C\right) + F\left(x_j^C\right) + 2\sum_{k_C=1}^{m_C-1} F\left(x_{k_C}\right) + 4\sum_{k_C=1}^{m_C-1} F\left(x_{k_{C-\frac{1}{2}}}\right)\right]$$

In the above, $$x_{k_C} = x_{j-1}^C + h_C k_C, \; k_C = 0, 1, 2, \dots m_C,$$

and $$x_{k_{C-\frac{1}{2}}}$$

represents midpoint of $[x_{k_C-1}, x_{k_C}]$. By the same reasoning, an integral expression corresponding to $l_{B_{j-1}^{\prime}B_j}$ is:

$$l_{B_{j-1}^{\prime}B_i} = \frac{h_B}{6}\left[G\left(x_{j-1}^B\right) + G\left(x_j^B\right) + 2\sum_{k_B=1}^{m_B-1} G\left(x_{k_B}\right) + 4\sum_{k_B=1}^{m_B-1} G\left(x_{k_{B-\frac{1}{2}}}\right)\right]$$

In the above, $$x_{k_B} = x_{j-1}^B + h_B k_B, \; k_B = 0, 1, 2, \dots m_B,$$

and $$x_{k_{B-\frac{1}{2}}}$$

represents midpoint of $[x_{k_B-1}, x_{k_B}]$.

Similarly, an integral expression corresponding to $l_{c_{j-1}E}$ is:

$$l_{c_{j-1}E} = \frac{h_E}{6}\left[F(x_{j-1}^C) + F(x_E^C) + 2\sum_{k_E=1}^{m_E-1} F(x_{k_E}) + 4\sum_{k_E=1}^{m_E-1} F\left(x_{k_{E-\frac{1}{2}}}\right)\right]$$

In the above, $$x_{k_E} = x_{j-1}^E + h_E k_E, \; k_E = 0, 1, 2, \ldots m_E,$$

and $$x_{k_{E-\frac{1}{2}}}$$

represents midpoint of $[x_{k_E-1}, x_{k_E}]$.

Correspondingly, an integral expression corresponding to $l_{B_{j-1}B_k}$, may be:

$$l_{B_{j-1}B_{E'}} = \frac{h_E'}{6}\left[G(x_{j-1}^B) + G(x_{E'}^B) + 2\sum_{k_{E'}=1}^{m_{E'}-1} G(x_{k_{E'}}) + 4\sum_{k_{E'}=1}^{m_{E'}-1} G\left(x_{k_{E'-\frac{1}{2}}}\right)\right]$$

After the conversion is performed by the above integral expressions, except for $$x_E^{B'}$$

which is unknown, other parameters are known, therefore, $$\frac{l_{c_{j-1}E} l_{B_{j-1}B_r}}{l_{c_{j-1}c_i}}$$

can be obtained, thus, the target integral equation can be constructed:

$$\frac{l_{c_{j-1}E} l_{B_{j-1}B_r}}{l_{c_{j-1}c_i}} = \int_{x_{j-1}^B}^{x_E^{B'}} \sqrt{1 + [g'(x)]^2}\, dx =$$

$$\frac{h_E'}{6}\left[G(x_{j-1}^B) + G(x_{E'}^B) + 2\sum_{k_{E'}=1}^{m_{E'}-1} G(x_{k_{E'}}) + 4\sum_{k_{E'}=1}^{m_{E'}-1} G\left(x_{k_{E'-\frac{1}{2}}}\right)\right]$$

In an embodiment, in the above process of acquiring $$\frac{l_{c_{j-1}E} l_{B_{j-1}B_r}}{l_{c_{j-1}c_i}},$$

a away to determine the step value of the compound Simpson integral formula may comprise: determining the step value of the compound Simpson integral formula according to the first end point of the first standard curve, the second end point of the first standard curve, an end point corresponding to the test sample on the first standard curve, the first end point of the second standard curve, and the second end point of the second standard curve.

Exemplarily, a calculation error of $$\frac{l_{c_{j-1}E} l_{B_{j-1}B_r}}{l_{c_{j-1}c_i}}$$

is:

$$\frac{l_{B_{j-1}B_r}(x_{j-1}^B - x_j^B)^5}{l_{c_{j-1}c_i}} \cdot \frac{1}{m_E^4} + \tag{3}$$

$$\frac{l_{c_{j-1}E}(x_{j-1}^C - x_E^C)^5}{l_{c_{j-1}c_i}} \cdot \frac{1}{m_B^4} + \frac{l_{c_{j-1}E} l_{B_{j-1}B_r}(x_{j-1}^C - x_j^C)^5}{l_{c_{j-1}c_i}^2} \cdot \frac{1}{m_C^4}$$

In the above, the formula (3) is obtained by performing error propagation calculation in numerical calculation on the error of the compound Simpson integral formula, each character in the formula (3) has been explained in the preceding, and will not be repeated herein.

For ease of calculation, the formula (3) may be equal to $$A \cdot \frac{1}{m_E^4} + B\frac{1}{m_B^4} + C\frac{1}{m_C^4}.$$

For data calculation processing efficiency and accuracy, values of $l_{B_{j-1}B_j}$, $l_{c_{j-1}c_i}$, and $l_{c_{j-1}E}$ can be simply estimated by a method of using a straight line to replace an arc line, i.e.:

$$l_{B_{j-1}B_r} \approx \sqrt{(x_{j-1}^B - x_j^B)^2 + (y_{j-1}^B - y_j^B)^2}$$

$$l_{c_{j-1}c_r} \approx \sqrt{(x_{j-1}^C - x_j^C)^2 + (y_{j-1}^C - y_j^C)^2}$$

$$l_{c_{j-1}E} \approx \sqrt{(x_{j-1}^C - x_E^C)^2 + (y_{j-1}^C - y_E^C)^2}$$

In the above, $l_{B_{j-1}B_r}$ is a value of $l_{n_{j-1}n_r}$ estimated by replacing the arc line with the straight line, $l_{c_{j-1}c_r}$ is a value of $l_{c_{j-1}c_i}$ estimated by replacing the arc line with the straight line, and $l_{c_{j-1}E}$ is a value of $l_{c_{j-1}E}$ estimated by replacing the arc line with the straight line.

After the values of A, B, and C are obtained by means of estimation, the values of $m_C$, $m_B$, and $m_E$ can be adjusted and set, so that the result obtained by formula (3) is as small as possible, and the smaller the calculation result of formula (3) is, the smaller the error of the subsequent calculation result is.

Further, if it is desired to further reduce the errors, the three values A, B, and C may be compared with each other and an item corresponding to the largest one is taken and increased. Exemplarily, if A>B>C, $m_E$ can be increased first, and $m_C$ and $m_B$ remain unchanged, so as to improve the accuracy most effectively.

After the values of $m_C$, $m_B$, and $m_E$ are adjusted, they are respectively substituted into $$h_C = \frac{x_j^c - x_{j-1}^c}{m_C}, \ h_B = \frac{x_j^B - x_{j-1}^B}{m_B}, \ \text{and} \ h_E = \frac{x_j^c - x_E^c}{m_E},$$

so as to determine the step value.

It can be understood that the step value is determined through the first end point of the first standard curve, the second end point of the first standard curve, the end point corresponding to the test sample on the first standard curve, the end point of the test sample on the first target arc line segment, the first end point of the second standard curve, and the second end point of the second standard curve, so as to reduce an error of finally acquired homogenization concentration.

Further, after obtaining the target integral equation, the target integral equation is solved by the bisection method, to obtain the homogenization concentration (i.e., $$\left( \text{i.e.,} \ x_E^{B\prime} \right)$$

corresponding to the actually measured signal value.

It should be noted that the function suitable for solution by the bisection method is a monotonic function, and the target integral equation satisfies the requirement.

Referring to Table 1, an interval [a, b] is set, where a is abscissas $$x_{j-1}^B$$

of point $B_{j-1}$, b is abscissas $$x_j^B$$

of point $B_j$, d is difference between the homogenization concentration and the concentration at the second end point of the second standard curve. If the concentration difference is greater than accuracy eps, a midpoint value c of a and b is taken, and the midpoint value c and a and a to-be-integrated function (i.e., arc length equation) are input into compound Simpson integral formula L for calculation, to obtain an intermediate homogenization concentration std. If the intermediate homogenization concentration std is less than $$\frac{l_E l_B}{l_C},$$

b is reassigned to be c, and if the intermediate homogenization concentration std is greater than or equal to $$\frac{l_E l_B}{l_C},$$

a is reassigned to be c. This process is continuously repeated until the final value obtained when the final cycle is ended is the homogenization concentration.

TABLE 1

| Algorithm: solve concentration value by bisection method |
| --- |
| Input: abscissas $x_{j-1}^B$ of point $B_{j-1}$; abscissas $x_j^B$ of point $B_j$; calculated proportion $\frac{l_E l_B}{l_C}$; compound Simpson integral formula $L$; to-be-integrated function G(x); accuracy eps; upper limit N of iteration times |
| Output: concentration $x_E^{B\prime}$ after conversion |

1.    $a \leftarrow x_{j-1}^B$, $b \leftarrow x_j^B$
2.    $d = 0$
3.    for n = 1, 2, . . . , N do
4.      $d \leftarrow |b - a|$
5.      if d > eps then
6.        $c \leftarrow \frac{b + a}{2}$
7.        std = L(G, a, c)
8.        if $std < \frac{l_E l_B}{l_C}$ then
9.          $b \leftarrow c$
10.       else
11.          $a \leftarrow c$
12.      else
13.        return $\frac{a + b}{2}$
14.    end for It can be understood that different pieces of detection equipment in the present disclosure are the test equipment and the reference equipment respectively, and the test sample is detected using different detection equipment, to obtain the signal value and the concentration corresponding to the test sample, so that coordinates of the test sample on the first standard curve are determined, then the first target arc line segment connecting the first end point and the second end point on the first standard curve is obtained according to the first end point and the second end point of the first standard curve, and the second target arc line segment connecting the first end point and the coordinates of the test sample on the first standard curve is obtained according to the first end point and the coordinates of the test sample on the first standard curve, and by the same reasoning, the third target arc line segment on the second standard curve is obtained. Further, as the first end point on the first standard curve and the first end point on the second standard curve are both different detection results obtained from the same comparison sample, the two points have a correspondence, and similarly, the second end point on the first standard curve is corresponding to the second end point on the second standard curve.

After the first target arc line segment, the second target arc line segment, and the third target arc line segment are obtained, the arc length equation of the fourth target arc line segment is established according to similar principle, wherein the fourth target arc line segment is an arc line from the first end point of the second standard curve to a corresponding end point of the test sample on the second standard curve. Then the arc length equation of the fourth target arc line segment is solved, to determine the concentration of the actually measured signal value on the second standard curve, i.e., to determine the homogenization concentration corresponding to the actually measured signal value, finally achieving homogenization of detection results of different detection equipment.

In an embodiment, after S560, the index homogenization conversion method further may include: judging whether a difference between the homogenization concentration and the concentration at the first end point or the second end point of the second standard curve is less than a preset threshold, and calibrating, if yes, the homogenization concentration according to a formula:

$$x_E^{B''} = \frac{x_{j-1}^B - x_{E'}^B}{2} \text{ or } x_E^{B''} = \frac{-x_j^B + x_{E'}^B}{2},$$

where $$x_E^{B''}$$

is the homogenization concentration after calibration, $$x_j^B$$

is the concentration at the first end point of the second target arc line segment, $$x_{j-1}^B$$

is the concentration at the second end point of the second target arc line segment, and $$x_{E'}^B$$

is the homogenization concentration.

It can be understood that, in order to avoid a situation that a calculation result is an infinite decimal or the number of iterations is excessive, etc., which results in equipment calculation breakdown, and improve data operation processing efficiency, a preset threshold can be set to improve data processing efficiency of the device. That is, the accuracy eps is set. When the difference between the homogenization concentration and the concentration at the second end point of the second standard curve is less than the accuracy eps, it can be approximately considered $$x_E^{B''} = \frac{x_{j-1}^B - x_{E'}^B}{2},$$

so that the final numerical value of the homogenization concentration is controllable, the calculation amount of the device for the homogenization concentration is reduced, making the calculation feasible, and improving the efficiency of data processing.

It can be understood that a person skilled in the art could flexibly adjust the preset threshold according to an actual application scenario.

1.2 Comparison Sample Number Determination Method

As described above, before step S510 in FIG. 5, the method for homogenization conversion of the same index detected by different equipment provided in the exemplary embodiments of the present disclosure further may include a step of determining the comparison sample, which will be described in detail below with reference to FIG. 7 to FIG. 9.

In the following, a comparison sample number determination device provided in an embodiment in one aspect of the present disclosure is described in detail with reference to FIG. 7, to achieve scientific selection of the comparison samples.

It can be understood that in the embodiments of the present disclosure, a determined comparison sample is embodied by the concentration value and the signal value, for example, a comparison sample 1: (1,1); a comparison sample 2: (2,2); a comparison sample 3: (3,3), then the total number of comparison samples is 3.

Referring next to FIG. 7, it is a flowchart of a comparison sample number determination device provided in an embodiment of the present disclosure, wherein the determination method includes:

step 710: determining a plurality of first comparison samples corresponding to the test equipment according to the first standard curve and a preset error condition. The first standard curve is used to characterize the relationship between the signal value of the test equipment and the concentration, and the signal value includes absorbance and luminescence value;

step 720: determining a plurality of second comparison samples corresponding to the reference equipment according to the second standard curve and the preset error condition. The second standard curve is used to characterize the relationship between the signal value of the reference equipment and the concentration, and the signal value includes absorbance and luminescence value; and step 730: determining a plurality of final comparison samples according to the plurality of first comparison samples and the plurality of second comparison samples.

In the embodiments of the present disclosure, the plurality of first comparison samples corresponding to the test equipment are determined according to the first standard curve and the preset error condition, and the plurality of second comparison samples corresponding to the reference equipment are determined according to the second standard curve and the preset error condition; and further, the plurality of final comparison samples are determined according to the plurality of first comparison samples and the plurality of second comparison samples, thus achieving the scientific selection of the comparison samples.

In some embodiments, an execution order of Step 710 and Step 720 is not limited, that is, it is feasible that the plurality of first comparison samples are determined first, or it is also feasible that the plurality of second comparison samples are determined first, which is not limited herein.

In some embodiments, each piece of detection equipment is set in advance with a standard curve of a certain detection index, i.e., the above first standard curve and second standard curve. By testing the concentration of a standard sample, a standard curve used to characterize the relationship between the signal value and the concentration is established.

In the embodiments of the present disclosure, the selected comparison sample is a comparison sample corresponding to the coordinate point on the standard curve. Therefore, it is necessary to select, based on the first standard curve, a first comparison sample conforming to the test equipment, and select, based on the second standard curve, a second comparison sample conforming to the reference equipment, and then to perform integration, then a relatively scientific comparison sample can be determined.

As an optional embodiment, step 710 includes: acquiring the lowest concentration value detectable by the test equipment; determining a starting coordinate point on the first standard curve according to the lowest concentration value detectable by the test equipment; determining a comparison sample corresponding to the starting coordinate point on the first standard curve, as the first comparison sample; and determining a plurality of first coordinate points on the first standard curve based on the preset error condition and the starting coordinate point on the first standard curve, wherein on the first standard curve, any coordinate point between two adjacent first coordinate points satisfies the preset error condition, the preset error condition being $$\left| \frac{x_c - x_D}{x_c} \right| \le d,$$

where C is this coordinate point, D is a coordinate point having the same signal value as this coordinate point on a line segment constituted by two adjacent first coordinate points, $x_C$ is a concentration value of the coordinate point C, $x_D$ is a concentration value of the coordinate point D, and d is a preset error value; and determining all comparison samples corresponding to the plurality of first coordinate points as the first comparison samples.

In such embodiment, the coordinate point corresponding to the first comparison sample is the first coordinate point, and the preset error condition is a condition that a difference needs to satisfy, with the difference between concentration results corresponding to two coordinate points having the same signal value between two adjacent first coordinate points and located on the standard curve and the straight line segment.

In some embodiments, the lowest concentration value detectable by the test equipment can be understood as the lowest detection limit detectable by the equipment, and correspondingly, there is also the highest detection limit detectable by the equipment. The two pieces of data are generally informed in instructions of equipment manufacturers, and therefore can be acquired directly.

Furthermore, in the case where the lowest concentration value is known and the first standard curve is known, a corresponding coordinate point on the first standard curve can be determined according to the lowest concentration value, and is taken as the starting coordinate point, and the comparison sample corresponding thereto is directly determined as the first comparison sample.

With regard to the preset error condition, referring to FIG. 8, a schematic diagram of the preset error condition, point A and point B are both first coordinate points on the first standard curve; for any point D on a line segment AB formed by the point A and the point B, a point having the same signal value as the point D, on the first standard curve, is point C, then the point C and the point D need to satisfy the condition $$\left| \frac{x_c - x_D}{x_c} \right| \le d.$$

In some embodiments, the preset error value may be understood as a maximum total allowable error of the test equipment for corresponding detection index.

Based on the above preset error condition, when determining a plurality of first coordinate points, firstly, the starting coordinate point can be taken as a first first coordinate point, and when a next first coordinate point is found, the first coordinate point is continuously searched for based on the next first coordinate point. That is, since the preset error condition defines the condition that the difference needs to satisfy, with the difference between concentration results corresponding to two coordinate points with the same signal value on the standard curve and the straight line segment between the two adjacent first coordinate points, the next first coordinate point needs to be determined in conjunction with the determined first coordinate point.

For example simply, if the point B meeting the requirement is determined through the point A, it is needed to continue to use the point B, and if the preceding point A and point B are identified as point B1 and point B2 respectively, point B3 meeting the requirement can be determined by taking the point B2 as the starting point; and point B4 meeting the requirement is determined continuously through the point B3, and so on.

Finally, after all the first coordinate points meeting the condition are found, the comparison samples corresponding to these first coordinate points are the first comparison samples, including a minimum detection limit sample and a maximum detection limit sample.

In the embodiments of the present disclosure, the preset error condition is used to define the difference between the concentration at the coordinate point on the line segment formed between two adjacent first coordinate points and the concentration at corresponding coordinate point on the standard curve, to ensure that each selected first comparison sample is within an allowable error range, i.e., meeting an allowable error condition, realizing the scientific selection of the first comparison samples.

In some embodiments, the process of determining a plurality of first coordinate points based on the preset error condition and the known first coordinate point can be realized by a matlab algorithm, i.e., sampling of each first coordinate point meeting the requirement is realized by the matlab algorithm based on the preset error condition and the known coordinate point.

In the embodiments of the present disclosure, based on the preset error condition and the corresponding starting coordinate point, rapid and accurate sampling of each coordinate point is realized by the matlab algorithm, further improving the accuracy and scientificity of the selected first comparison samples.

In some embodiments, the determination method further includes: acquiring the highest concentration value detectable by the test equipment as the starting coordinate point; calculating and determining another coordinate point on the first standard curve according to the starting coordinate point of the highest concentration value detectable by the test equipment; and determining, as the first comparison sample, the comparison sample corresponding to the determined another coordinate point on the first standard curve.

In such embodiment, based on the highest concentration value detectable by the test equipment as the starting coordinate point, another corresponding coordinate point on the first standard curve can be determined, and the comparison sample corresponding to the another coordinate point also can be determined as the first comparison sample.

In the embodiments of the present disclosure, by determining another coordinate point corresponding to the highest concentration value detectable by the test equipment, and taking the another coordinate point as the starting point, the corresponding comparison samples are determined in sequence according to the preceding allowable total error, i.e., as the first comparison samples, increasing the number of first comparison samples.

For ease of understanding, the above process of determining the plurality of first coordinate points is described in more detail in the following.

As shown in FIG. 8, a detection linear range of the first standard curve and the coordinates of the first point A of the lowest detection limit are known, a point B closest to the point A is found on the curve, so that two points C, D in the diagram parallel to x-axis are within a concentration range of $x^A \leq x \leq x^B$, any point within the range satisfies $$\left| \frac{x_c - x_D}{x_c} \right| \leq d,$$

(d is a maximum allowable total error of a corresponding detection index of the equipment), thus, the coordinates of the point B are determined, and further more points are obtained in sequence to calculate a relevant conversion proportion using a line segment like AB, thus a homogenization result is calculated by substituting the proportion into the equation, and is clinically applied in place of an original detection result.

Assuming that a functional relationship of straight line AB is $y=g(x)$, and the standard curve equation is $y=f(x)$, since the point C and the point D are on $y=f(x)$ and $y=g(x)$ respectively, $x_C=f^{-1}(y)$ and $x_D=g^{-1}(y)$.

Since each point satisfies $$\left| \frac{x_c - x_D}{x_c} \right| \leq d,$$

then $$\left| \frac{f^{-1}(y) - g^{-1}(y)}{f^{-1}(y)} \right| \leq d;$$

let $$m(y) = \left| \frac{f^{-1}(y) - g^{-1}(y)}{f^{-1}(y)} \right|.$$

Due to existence of an extreme point $y_0$, i.e., a derivative thereof $m'(y_0)=0$; an extremum is taken at the extreme point, $m(y_0)=d$; and joint solving is performed, to obtain ordinates $y_0=y_C=y_D$ corresponding to the point C and the point D, and further to obtain abscissas $x_C$ and $x_D$ of the two points C and D.

The coordinates $(x_A,y_A)$ and $(x_D,y_D)$ of two points A and D are known, so that an expression of the straight line $g(x)$ can be obtained; and the coordinates $B(x_B,y_B)$ of an intersection point of the corresponding curve and straight line can be obtained by combining the functional relationship of the straight line AB and the functional relationship of the standard curve.

Referring next to FIG. 9, assuming that the functional relationship of the standard curve is $y=x^2$, the first point, point A, has the coordinates (2, 4), a point B closest to the point A is found on the curve to satisfy $$\left| \frac{x_C - x_D}{x_C} \right| \leq d$$

(d is 10%), and the coordinates of point B are obtained by solving.

The functional relationship of the standard curve is $y=x^2$, the functional relationship of the straight line AB is set to be $y=kx+b$, the coordinates of the point B are $(x_B,y_B)$, and since the straight line passes through the point A, $b=4-2k$.

Since B is on the standard curve, $y_B=x_B^2$, and since the straight line passes through the point B, $$k = \frac{y_B - y_A}{x_B - x_A} = (x_B + 2),$$

the equation of the straight line AB is: $y=(x_B+2)x-2x_B$.

Substitute $x_C$ and $x_D$ into $$\frac{x_C - x_D}{x_C} \Bigg| \leq d$$

to obtain:

$$\left| \frac{\sqrt{y} - \frac{y + 2x_B}{x_B + 2}}{\sqrt{y}} \right| \leq 0.1.$$

Let $$m(y) \frac{\sqrt{y} - \frac{y + 2k - 4}{k}}{\sqrt{y}} - 0.1,$$

since $$\left| \frac{x_C - x_D}{x_C} \right|$$

has an extreme point $y_0$ satisfying the condition, the equation is derived, let $m'(y_0)=0$, to obtain $y_0=2k-4=2x_B$. Let $m(y_0)=0$, to obtain:

$$0.9 = \frac{2\sqrt{2k - 4}}{k}.$$

Substitute $y_0=2k-4=2x_B$ into $$0.9 = \frac{2\sqrt{2k - 4}}{k},$$

to obtain equation $9y-40\sqrt{y}+36=0$.

$$\sqrt{y_1} = \frac{40 + \sqrt{304}}{18} \text{ and } \sqrt{y_2} \frac{40 - \sqrt{304}}{18}$$

are obtained, which may be abscissas corresponding to the point C.

Since $x_C > 2$, the abscissa of the point C is $$x_C = \sqrt{y_0} = \frac{40 + \sqrt{304}}{18},$$

substitute $$x_C = \sqrt{y_0} = \frac{40 + \sqrt{304}}{18}$$

into $y_0 = 2k - 4 = 2x_B$, to obtain $$k = \frac{400 + 10\sqrt{304}}{81}, x_B = \frac{238 + 10\sqrt{304}}{81} = 5.09,$$

so the coordinates of the B point are (5.09,25.90).

The above process may be implemented by the matlab algorithm, and corresponding matlab algorithm code is as follows:

i % x represents the concentration, and y represents the signal value. A sampling point (i.e., the first coordinate point) is calculated below by taking the concentration as step length.

The % standard curve relationship is y=f(x)=x^2, the point A is (2,4), and the point B is to be obtained below.

f1=@(x) x.^0.5; inverse function expression x=f1(y) of % standard curve, modify f1 to be applicable to all data, here a square root function is used:

d=0.1; % d is the maximum allowable error, herein 0.1 is taken y0=4; % y0 represents the signal value at a starting point, herein 4 is taken, ymax=30; % ymax represents the maximum signal value, herein 30 is taken y=y0:0.1:ymax; % y is luminescence amount, the luminescence amount of the starting point A is 4, the luminescence amount ymax of a terminal point is 30, the step length is 0.1, the luminescence amount 4-30 is divided into 260 small intervals, to generate a vector y X=f1(y); % x is the concentration x corresponding to the luminescence amount y on the standard curve. The starting point is f1(4)=2, the terminal point is f1(30), there are 261 end points in total, and these end points are considered as possible sampling points b=[ ]; % b represents all the real sampling points k=0; % k indicates whether sampling is performed a=0; % initialize a, a denotes the most recent (last) sampling point k=zeros(1,length(y3)); % initialize k, i-th component of k represents whether sampling is performed at a possible sampling point obtained by the i-th numerical value, wherein if k(i)=1, the i-th possible sampling point is really sampled, and if k(i)=0, the i-th possible sampling point is not sampled k(1)=1; % sample the first possible sampling point, i.e. a point with the concentration of 0.01, facilitating calculation k(length(y3)=1; % sample the last possible sampling point, i.e., a point with the maximum luminescence amount, facilitating calculation b=[ ]; % initialize sampling point set, the initial sampling point set is empty % take the concentration x as a step length, obtain real sampling points by iteration for i=1:length(x)−1; % iterate the 1st to the last possible sampling point, select real sampling points according to whether the maximum allowable error is exceeded p4=[f1(a)−x(i+1)]/[a−y(i+1)]; % calculate equation of line segment 1 from the previous real sampling point a to the (i+1)-th possible sampling point or j=a:0.1:y(i+1); % check whether there is a point, between the previous real sampling point and the (i+1)-th point, exceeding the maximum allowable error, where the error of the signal value is 0.1 if abs(f1(j)−p4*(j−a)−f1(a))/f1(j)>d; % if there is a point, |(concentration corresponding to standard curve-concentration corresponding to line segment 1)/concentration corresponding to standard curve|>maximum allowable error, step back, and the i-th point is really sampled k(i)=1; % if the (i+1)-th point is not sampled, it will cause that there is a point exceeding the error range between the previous sampling point a and (i+1)-th point, indicating that the sampling cannot be performed at the (i+1)-th point, and the sampling is performed at the i-th point (meaning that it will jump back by one point if the allowable error is exceeded)

end end if k(i)==1; % k(i)=1 means real sampling at the i-th possible sampling point a=y(i); % if the i-th possible sampling point is really sampled, the signal value a of the latest real sampling point is updated, and let the signal value of the i-th possible sampling point be a b=[b,a]; % b is a set of signal values of all real sampling points, update the set of signal values of the sampling points, i.e., add a new real sampling point signal value end end b=[b y(length(x))]; % b is a set of signal values of all real sampling points, plus the point with the largest signal value n=length(b); % the solved n is the fewest sampling points, i.e., number of elements in b plot(f1(b), b, 'o-'); % plot concentrations and signal values corresponding to real sampling points hold on; % plot a curve on the same diagram plot(x,y,'r'); % plot a standard curve b(2); % b(2) represents the signal value of point B when the signal value of the starting point A is y0 f1 (b(2)); % f(b(2)) represents the concentration at point B when the signal value of the starting point A is $y_0$ Results: the signal value of point B is 25.9000, concentration at point B is 5.09, i.e., coordinates of point B are (5.09,25.90).

The second comparison sample corresponding to the detection equipment is determined in a way similar to that for determining the first comparison sample corresponding to the test equipment. As an optional embodiment, step 720 includes: acquiring the lowest concentration value detectable by the reference equipment; determining a starting coordinate point on the second standard curve according to the lowest concentration value detectable by the reference equipment; determining, as the second comparison sample, a corresponding comparison sample calculated according to the starting coordinate point on the second standard curve; and determining a plurality of second coordinate points on the second standard curve based on the preset error condition and the starting coordinate point on the second standard curve, wherein on the second standard curve, any coordinate point between two adjacent first coordinate points satisfies the preset error condition, the preset error condition being $$\left| \frac{x_E - x_F}{x_E} \right| \le d,$$

where E is this coordinate point, F is a coordinate point having the same signal value as this coordinate point, on a line segment constituted by two adjacent second coordinate points, $x_E$ is a concentration value of the coordinate point E, $x_F$ is a concentration value of the coordinate point F, and d is a preset error value; and determining all comparison samples corresponding to the plurality of second coordinate points as the second comparison samples.

In the embodiments of the present disclosure, the preset error condition is used to define the difference between the concentration at the coordinate point on the line segment formed by two adjacent second coordinate points and the concentration at corresponding coordinate point on the standard curve, to ensure that each selected second comparison sample is within an allowable error range, i.e., meeting an error condition, realizing the scientific selection of the second comparison samples.

In some embodiments, based on the preset error condition and the starting coordinate point on the second standard curve, the determining a plurality of second coordinate points on the second standard curve includes: determining a plurality of second coordinate points on the second standard curve by a preset matlab algorithm, based on the preset error condition and the starting coordinate point on the second standard curve.

In the embodiments of the present disclosure, based on the preset error condition and the corresponding starting coordinate point, rapid and accurate sampling of each coordinate point is realized by the matlab algorithm, further improving the accuracy and scientificity of the selected second comparison samples.

In some embodiments, the comparison sample determination method further includes: acquiring the highest concentration value detectable by the reference equipment as the starting coordinate point; determining another coordinate point on the second standard curve according to the starting coordinate point of the highest concentration value detectable by the reference equipment; and determining the comparison sample corresponding to the determined another coordinate point on the second standard curve as the second comparison sample.

In the embodiments of the present disclosure, by determining another coordinate point corresponding to the highest concentration value detectable by the reference equipment, and determining the comparison sample corresponding to the determined another coordinate point as the second comparison sample, the corresponding comparison sample concentration is calculated and acquired according to the preceding allowable error, so as to continuously expand the number of second comparison samples.

For implementation modes of various foregoing processes, reference is made to the implementation modes of the foregoing process of determining the first comparison sample, which is not repeatedly described herein.

After determining the plurality of first comparison samples and the plurality of second comparison samples, respectively, in step 730, a plurality of final comparison samples are determined according to the plurality of first comparison samples and the plurality of second comparison samples.

It can be understood that, because there may be repeated comparison samples in the plurality of first comparison samples and the plurality of second comparison samples, the repeated comparison samples need to be de-duplicated.

As an optional embodiment, step 730 includes: determining identical comparison samples in the plurality of first comparison samples and the plurality of comparison samples; performing de-duplication on the identical comparison samples to obtain a plurality of de-duplicated comparison samples; detecting the plurality of de-duplicated comparison samples by the test equipment or the reference equipment, to obtain detection curves corresponding to the plurality of de-duplicated comparison samples; determining similar comparison samples according to the detection curves, wherein coordinate points of the similar comparison samples on the detection curves are adjacent coordinate points, and a concentration difference between the adjacent coordinate points is within a preset error range; and performing de-duplication on the similar comparison samples to obtain a plurality of final comparison samples.

In such embodiment, two types of de-duplication of comparison samples are involved. One is the de-duplication of completely identical comparison samples. For example, for a comparison sample 1: (1,3) and a comparison sample 2: (1,3), the two comparison samples have the same signal value and concentration, and belong to identical comparison samples.

For the identical comparison samples, when performing the de-duplication, redundant comparison samples are deleted, and only one comparison sample is reserved.

The other is to de-duplicate similar comparison samples. First, the comparison samples with similar concentration results are determined from a plurality of comparison samples. In the embodiments of the present disclosure, the test equipment or the reference equipment is used to detect the plurality of de-duplicated comparison samples, corresponding detection curves can be obtained, and then the comparison samples with similar results are found on the detection curves.

In some embodiments, coordinate points of the comparison samples with similar results on the detection curves are adjacent coordinate points, and the concentration difference between the adjacent coordinate points is within a preset error range. For example, for adjacent coordinate points J and K, if the difference of corresponding concentration values is within the preset error range, the comparison samples corresponding to the adjacent coordinate points J and K are comparison samples with similar results.

In the above, the preset error range may be corresponding to or the same as the preset error value in the foregoing preset error condition, which is not limited herein.

For the comparison samples with similar results, when performing the de-duplication, redundant comparison samples are deleted, and only one comparison sample is reserved.

In the embodiments of the present disclosure, by performing the de-duplication on identical comparison samples, and by performing the de-duplication on similar comparison samples, sufficient de-duplication on the comparison samples is achieved, thereby achieving reduction of the comparison samples.

After the plurality of final comparison samples are determined, they can be used, for example, for determining a homogenization calculation ratio, for optimizing the detection result, or the like, which is not limited herein.

The comparison sample number determination device provided in the exemplary embodiments of the present disclosure as described above also may be applied to various medical scenarios in which the comparison samples need to be used for detection.

Application scenario 1: accurate detection results are of vital importance to disease diagnosis of clinicians, while in the clinical practical detection process, a patient specimen needs to be first placed in detection equipment for detection. In order to ensure the detection result to be accurate, some quality control products with known detection results usually need to be detected in advance. Generally, fixed-value quality control products at three levels of high value, median value, and low value are selected for detection, so as to determine whether a difference between a detection result of the equipment and a result of the fixed-value quality control product is within an acceptable range. If the difference is within the acceptable range, it indicates that the detection result is accurate, and if the difference exceeds the acceptable range, it indicates that the detection result is inaccurate, and the detection result is unreliable and cannot be clinically applied. However, how to determine the specific detection values of the quality control product with three concentrations of high value, medium value, and low value is not uniformly specified at present, and therefore is relatively random.

Accordingly, in the application scenario 1, the comparison sample can be determined according to the technical solutions provided in the embodiments of the present disclosure, and the comparison sample is taken as corresponding quality control product.

Application scenario 2: a plurality of different pieces of detection equipment can be used for detecting the same index, and in order to compare whether the detection results of the same index detected by the two pieces of detection equipment are consistent or whether the difference therebetween can be accepted by clinicians, the results of the two pieces of detection equipment need to be compared, but how to determine the comparison samples of the two pieces of detection equipment is a major and difficult point of clinical detection work.

Accordingly, in the application scenario 2, the comparison sample can be determined according to the technical solutions provided in the embodiments of the present disclosure, so as to perform the detection based on the comparison sample.

In the above scenarios, the detection equipment may be a large detection instrument, wearable detection equipment, or other detection equipment. Moreover, parameters involved in the detection equipment include signal value and concentration. In application, actually detected data is the signal value, and the concentration is calculated through the standard curve between the signal value and the concentration, but a detection result finally required is concentration. In the above, the signal value includes absorbance and luminescence value; or more other types of signal values, which are not limited herein.

In some embodiments, the technical solution can also be applied to detection equipment in other application scenarios, and is not limited to the medical scenario; and correspondingly, the parameters therein are not limited to the signal value and the concentration, either; that is, the inventive concept of the technical solution can be applied to other application scenarios, and does not constitute a limitation to the embodiments of the present disclosure.

1.3 Index Homogenization (Arc Line) Conversion Device

Figure 10:
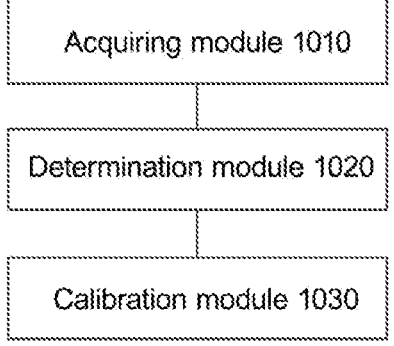
FIG. 10 is a structural diagram of an index homogenization conversion device provided in an embodiment in one aspect of the present disclosure.

Based on the same inventive concept, referring to FIG. 10, an embodiment of the present disclosure further provides an index homogenization conversion device 1000. The device 1000 includes: an acquiring module 1010 and a determination module 1020.

The acquiring module 1010 is configured to acquire an actually measured signal value, wherein the actually measured signal value is a signal value obtained by detecting a test sample by test equipment. The determination module 1020 is configured to determine a concentration of the actually measured signal value on a first standard curve; the first standard curve is a preset concentration-signal value relationship curve of the test equipment. The acquiring module 1010 is further configured to obtain a first target arc line segment of the first standard curve according to a first end point of the first standard curve and a second end point of the first standard curve, and obtain a second target arc line segment of the first standard curve according to the first end point of the first standard curve and an end point corresponding to the test sample on the first standard curve, the first end point and the second end point of the first standard curve being end points corresponding to different comparison samples; and obtain a third target arc line segment of a second standard curve according to a first end point of the second standard curve and a second end point of the second standard curve, wherein the second standard curve is a preset concentration-signal value relationship curve of the reference equipment, the first end point of the second standard curve and the first end point of the first standard curve are concentrations-signal values corresponding to the same comparison sample, and the second end point of the second standard curve and the second end point of the first standard curve are concentrations-signal values corresponding to the same comparison sample. The determination module 1020 is further configured to determine an arc length equation of a fourth target arc line segment according to the first target arc line segment, the second target arc line segment, and the third target arc line segment, wherein the fourth target arc line segment is an arc line segment from the first end point of the second standard curve to corresponding end point of the test sample on the second standard curve; and determine a homogenization concentration corresponding to the actually measured signal value according to the arc length equation of the fourth target arc line segment.

In an embodiment, the determination module 1020 is further configured to determine a length relationship between an arc length of the fourth target arc line segment and an arc length of each target arc line segment according to respective arc lengths of the first target arc line segment, the second target arc line segment, and the third target arc line segment, and determine the arc length equation of the fourth target arc line segment based on an arc length calculation formula and the length relationship.

In an embodiment, the determination module 1020 is further configured to process the arc length equation by a compound Simpson integral formula and a bisection method, and determine the homogenization concentration corresponding to the actually measured signal value.

In an embodiment, the determination module 1020 is further configured to convert the arc length equation by means of the compound Simpson integral formula to obtain a target integral equation, and solve the target integral equation by the bisection method, to determine the homogenization concentration corresponding to the actually measured signal value.

In an embodiment, the determination module 1020 is further configured to determine a step value of the compound Simpson integral formula according to the first end point of the first standard curve, the second end point of the first standard curve, an end point corresponding to the test sample on the first standard curve, an end point of the test sample on the first target arc line segment, the first end point of the second standard curve, and the second end point of the second standard curve.

In an embodiment, the index homogenization conversion device 1000 further includes a calibration module 1030.

The calibration module 1030 is configured to judge whether a difference between the homogenization concentration and the concentration at the first end point or the second end point of the second standard curve is less than a preset threshold, and calibrate, if yes, the homogenization concentration according to a formula:

$$\frac{x_{j-1}^B - x_{E'}^B}{2} \ or \ x_E^{B''} = \frac{-x_j^B + x_{E'}^B}{2},$$

where $$x_E^{B''}$$

is the homogenization concentration after calibration, $$x_j^B$$

is the concentration at the first end point of the second target arc line segment, $$x_{j-1}^B$$

is the concentration at the second end point of the second target arc line segment, and $$x_{E'}^B$$

is the homogenization concentration.

1.4 Comparison Sample Number Determination Device

Figure 11:
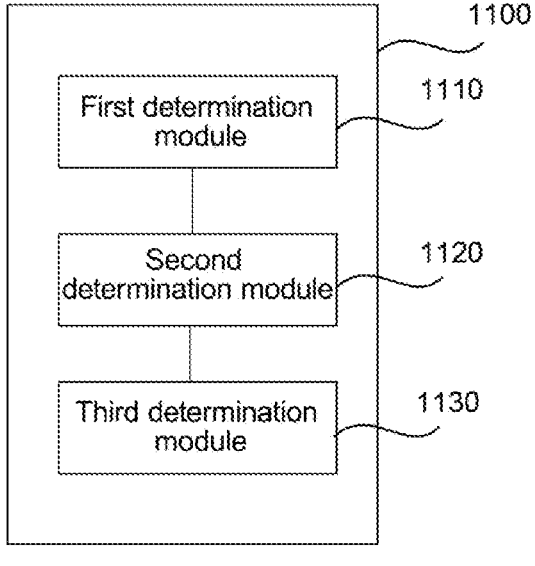
FIG. 11 is a structural schematic diagram of a comparison sample number determination method provided in an embodiment in one aspect of the present disclosure.

Based on the same inventive concept, referring to FIG. 11, the index homogenization conversion device 1000 in the exemplary embodiments of the present disclosure further includes: a comparison sample number determination device 1100, wherein the comparison sample number determination device 1100 is configured to determine the number of comparison samples before step S510 of acquiring an actually measured signal value as in FIG. 5.

The comparison sample number determination device 1100 may include: a first determination module 1110, a second determination module 1120, and a third determination module 1130.

The first determination module 1110 is configured to: determine a plurality of first comparison samples corresponding to the test equipment according to the first standard curve and a preset error condition, wherein the first standard curve is used to represent the relationship between the signal value of the test equipment and the concentration; the second determination module 1120 is configured to determine a plurality of second comparison samples corresponding to the reference equipment according to the second standard curve and the preset error condition, wherein the second standard curve is used to characterize the relationship between the signal value of the reference equipment and the concentration; and the third determination module 1130 is configured to determine a plurality of final comparison samples according to the plurality of first comparison samples and the plurality of second comparison samples.

In the embodiments of the present disclosure, the first determination module 1110 is specifically configured to: acquire the lowest concentration value detectable by the test equipment; determine a starting coordinate point on the first standard curve according to the lowest concentration value detectable by the test equipment; determine a comparison sample corresponding to the starting coordinate point on the first standard curve as the first comparison sample; and determine a plurality of first coordinate points on the first standard curve based on the preset error condition and the starting coordinate point on the first standard curve, wherein on the first standard curve, difference between concentrations at any two coordinate points with the same signal value on a curve and a straight line segment between two adjacent first coordinate points satisfies the preset error condition, the preset error condition being $$\left| \frac{x_C - x_D}{x_C} \right| \le d,$$

where C is this coordinate point, D is a coordinate point having the same signal value as this coordinate point and located on a line segment constituted by the two adjacent first coordinate points, $x_C$ is a concentration value of the coordinate point C, $x_D$ is a concentration value of the coordinate point D, and d is a preset error value; and determine all comparison samples corresponding to the plurality of first coordinate points as the first comparison samples.

In the embodiments of the present disclosure, the first determination module 1110 specifically is further configured to: determine a plurality of first coordinate points on the first standard curve by a preset matlab algorithm, based on the preset error condition and the starting coordinate point on the first standard curve.

In the embodiments of the present disclosure, the first determination module 1110 is further configured to: acquire the highest concentration value detectable by the test equipment as the starting coordinate point; calculate and determine another coordinate point on the first standard curve according to the starting coordinate point of the highest concentration value detectable by the test equipment; and determine the comparison sample corresponding to the another coordinate point on the first standard curve as the first comparison sample.

In the embodiments of the present disclosure, the second determination module 1120 is further configured to: acquire the lowest concentration value detectable by the reference equipment; calculate and determine a starting coordinate point on the second standard curve according to the lowest concentration value detectable by the reference equipment; determine a comparison sample corresponding to the starting coordinate point on the second standard curve as the second comparison sample; and determine a plurality of second coordinate points on the second standard curve based on the preset error condition and the starting coordinate point on the second standard curve, wherein on the second standard curve, any coordinate point between two adjacent second coordinate points satisfies the preset error condition, the preset error condition being $$\left| \frac{x_E - x_F}{x_E} \right| \le d,$$

where E is this coordinate point, F is a coordinate point having the same signal value as this coordinate point and located on a line segment constituted by two adjacent second coordinate points, $x_E$ is a concentration value of the coordinate point E, $x_F$ is a concentration value of the coordinate point F, and d is a preset error value; and determine all comparison samples corresponding to the plurality of second coordinate points as the second comparison samples.

In the embodiments of the present disclosure, the second determination module 1120 specifically is further configured to: determine a plurality of second coordinate points on the second standard curve by a preset matlab algorithm, based on the preset error condition and the starting coordinate point on the second standard curve.

In the embodiments of the present disclosure, the second determination module 1120 is further configured to: acquire the highest concentration value detectable by the reference equipment as the starting coordinate point; determine another coordinate point on the second standard curve according to the starting coordinate point of the highest concentration value detectable by the reference equipment; and determine the comparison sample corresponding to the another coordinate point on the second standard curve as the second comparison sample.

In the embodiments of the present disclosure, the third determination module 1130 is specifically configured to: determine identical comparison samples in the plurality of first comparison samples and the plurality of comparison samples; perform de-duplication on the identical comparison samples to obtain a plurality of de-duplicated comparison samples; detect the plurality of de-duplicated comparison samples by the reference equipment or the test equipment, to obtain detection curves corresponding to the plurality of de-duplicated comparison samples; determine similar comparison samples according to the detection curves, wherein coordinate points of the similar comparison samples on the detection curves are adjacent coordinate points, and a concentration difference between the adjacent coordinate points is within a preset error range; and perform de-duplication on the similar comparison samples to obtain a plurality of final comparison samples.

The comparison sample number determination device 1100 is corresponding to the foregoing comparison sample determination method, and various functional modules are corresponding to respective steps in the method, therefore, for the implementation mode of each functional module, reference may be made to the description of the method embodiments in the foregoing embodiments, which is not repeated herein.

A device 600 for homogenization conversion of the same index detected by different equipment is corresponding to the method for homogenization conversion of the same index detected by different equipment, various functional modules are corresponding to respective steps in the homogenization method, therefore, for the implementation mode of each functional module, reference may be made to the implementation mode of various steps in the foregoing embodiment, which is not repeated herein.

2.1 Index Homogenization Straight Line Conversion Method

The technical solutions provided in the embodiments of the present disclosure can be applied to medical application scenarios, that is, the detection equipment involved in the medical scenarios are homogenized, wherein the detection equipment may be wearable detection equipment or other detection equipment.

Parameters involved in the detection equipment include absorbance and concentration, and in application, actually detected data is the absorbance. The concentration is calculated through the standard curve between the absorbance and the concentration, but a detection result finally required is concentration.

In some embodiments, the technical solution can also be applied to homogenization of detection equipment in other application scenarios, and is not limited to the medical scenario; and correspondingly, the parameters therein may be the absorbance and the concentration, for example, in some application scenarios, the parameters therein may be luminescence value and concentration; that is, the inventive concept of the technical solution can be applied to other application scenarios, and does not constitute a limitation to the embodiments of the present disclosure.

A hardware running environment of the technical solution provided in the embodiments of the present disclosure may be detection equipment itself, i.e., the detection equipment itself performs homogenization processing on the detection result of its own. As another embodiment, the hardware running environment further may be a separate data processing end, the data processing end is dedicated to the homogenization of detection results of different detection equipment, and the data processing end may be various kinds of electronic equipment, which is not limited herein.

It is assumed that there are now two pieces of detection equipment: test equipment and reference equipment respectively. The same index is detected for the same sample, wherein the absorbance detected by the test equipment is $x^C$, the corresponding concentration is $y^C$; the absorbance detected by the reference equipment is $x^B$, and the corresponding concentration is $y^B$. The test equipment and the reference equipment both have two detection methods available for selection, i.e., a non-competitive method (two parameters x and y on coordinate axis form a curve of positive correlation) and a competitive method (two parameters x and y on coordinate axis form a curve of negative correlation). It can be understood that x and y are parameters representing absorbance and concentration respectively. In FIG. 12 to FIG. 23, for ease of understanding and description, y/concentration is used as ordinate, and x/absorbance is used as abscissa. It should be understood that, parameter representation and coordinate representation of x and y are merely exemplary. In other embodiments, the absorbance represented by x and the concentration represented by y can be exchanged, and the x abscissa and the y ordinate can also be exchanged.

Figure 12:
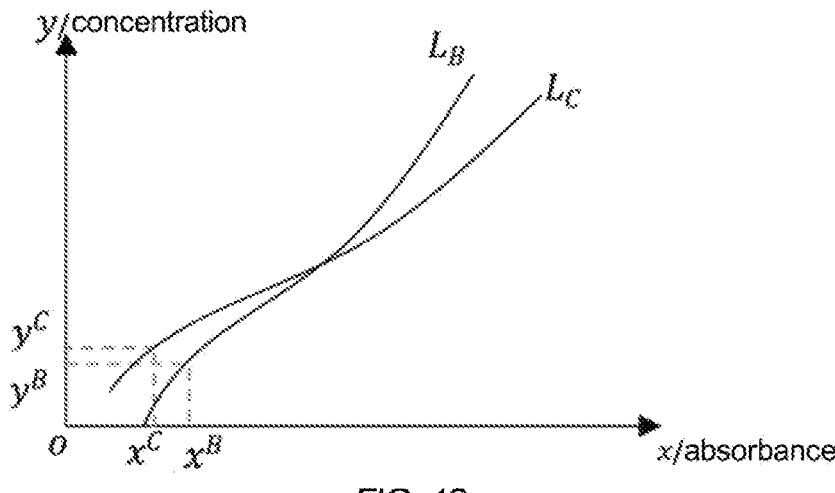
FIG. 12 is a first exemplary diagram of standard curves of absorbance and concentration provided in an embodiment in another aspect of the present disclosure.
Figure 13:
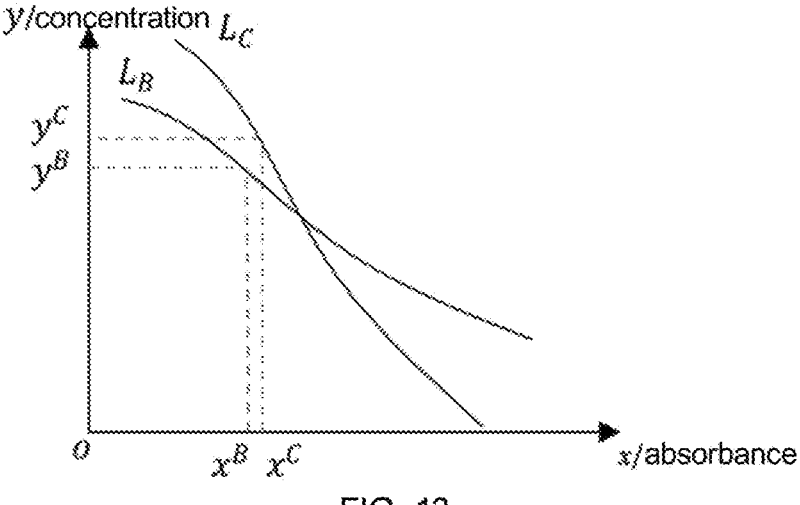
FIG. 13 is a second exemplary diagram of standard curves of absorbance and concentration provided in an embodiment in another aspect of the present disclosure.
Figure 14:
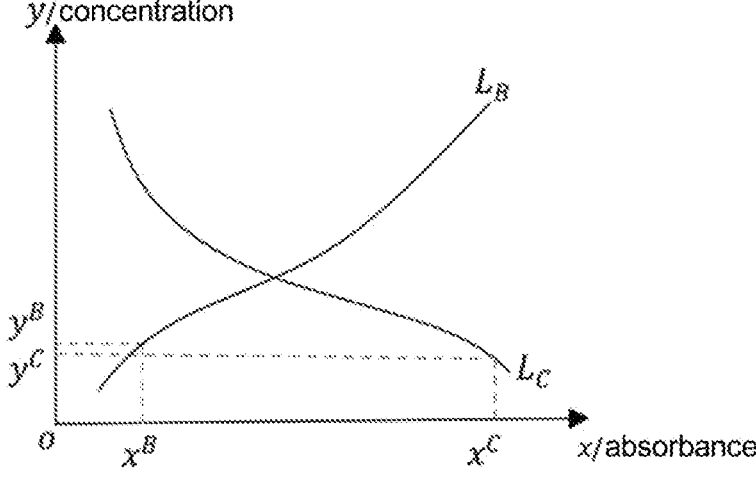
FIG. 14 is a third exemplary diagram of standard curves of absorbance and concentration provided in an embodiment in another aspect of the present disclosure.

There are in total 4 cases for detecting the same index of the same sample by two pieces of detection equipment:

case 1: both the reference equipment and the test equipment use the non-competitive method, with standard curves of the absorbance and concentration obtained as shown in FIG. 12;

case 2: both the reference equipment and the test equipment use the competitive method, with standard curves of the absorbance and concentration obtained as shown in FIG. 13;

case 3: the reference equipment uses the non-competitive method, and the test equipment uses the competitive method, with standard curves of the absorbance and concentration obtained as shown in FIG. 14; and case 4: the reference equipment uses the competitive method, and the test equipment uses the non-competitive method, with standard curves of the absorbance and concentration obtained as shown in FIG. 15.

In FIG. 12 to FIG. 15, $L_C$ represents the standard curve of the absorbance and corresponding concentration of the test equipment, and $L_B$ represents the standard curve of the absorbance and corresponding concentration of the reference equipment.

As for the four cases above, the test equipment and the reference equipment detect the same index of the same sample, and the absorbances and the concentrations are all different no matter whether the same detection method is selected or different detection methods are selected. To realize homogenization of the detection results of the test equipment and the reference equipment for the same index of the same sample, the key is to determine a point on the standard curve of the test equipment, then find a corresponding point on the standard curve of the reference equipment, and homogenization of the results can be realized by converting the two detection results.

Based on the above inventive concept, in another aspect, the present disclosure provides another method for homogenization conversion of the same index detected by different equipment, for realizing homogenization of detection results of different detection equipment. In the method for homogenization conversion of the same index detected by different equipment in one aspect of the present disclosure, the conversion based on a straight line segment may be performed, therefore, the method for homogenization conversion of the same index detected by different equipment can be an index homogenization straight line conversion method. It can be understood that the index homogenization straight line conversion method and the index homogenization arc line conversion method in the present disclosure have the same inventive concept.

To facilitate understanding of the present embodiment, the method for homogenization conversion of the same index detected by different equipment is described in detail with reference to FIG. 16. FIG. 16 is a flowchart of the method for homogenization conversion of the same index detected by different equipment provided in an embodiment in another aspect of the present disclosure, wherein the method may include:

step 1610: acquiring an actually measured absorbance, wherein the actually measured absorbance is absorbance obtained by detecting a test sample by the test equipment;

step 1620: determining a first target line segment corresponding to the actually measured absorbance, wherein the first target line segment is a line segment on a first straight line segment combination, the first straight line segment combination is a line segment combination obtained by detecting a plurality of comparison samples by the test equipment, and each coordinate point is corresponding to the absorbance and concentration of one comparison sample;

step 1630: determining a homogenization proportion according to an absorbance at the first end point of the first target line segment, an absorbance at the second end point of the first target line segment, and the actually measured absorbance, wherein the homogenization proportion is used to convert the concentration corresponding to the actually measured absorbance into a homogenization concentration;

step 1640: determining a second target line segment corresponding to the first target line segment, wherein the second target line segment is a line segment on a second straight line segment combination, the second straight line segment combination is a line segment combination obtained by detecting a plurality of comparison samples by the reference equipment, and each coordinate point is corresponding to the absorbance and concentration of one comparison sample; and step 1650: determining the homogenization concentration corresponding to the actually measured absorbance according to the concentration at the first end point of the second target line segment, the concentration at the second end point of the second target line segment, and the homogenization proportion.

In the embodiments of the present disclosure, different pieces of detection equipment are test equipment and reference equipment respectively, and a detection result of the reference equipment is taken as a benchmarking result, i.e., after homogenization conversion of the same detection index of the same sample, the detection result of the test equipment tends to be consistent with that of the reference equipment. The detection result of the detection equipment that needs to be homogenized is concentration, the test equipment corresponds to the first straight line segment combination, the reference equipment corresponds to the second straight line segment combination, and various points on the line segment on the first straight line segment combination and on the line segment on the second straight line segment combination have a correspondence therebetween.

After acquiring the actually measured absorbance, which specific line segment (namely, the first target line segment) where the absorbance is located is determined first according to the absorbance value, and then according to the absorbances at two end points of the specific line segment, a proportional relationship (namely, a homogenization proportion) between the concentration corresponding to the actually measured absorbance and concentrations at the two end points can be determined; since the second target line segment and the first target line segment have a correspondence therebetween, on the second target line segment, the concentrations at the two end points and the homogenization concentration also comply to the homogenization proportion (Note: the homogenization proportions corresponding to different line segments are different, and need to be calculated according to the actually measured result). Further, based on the homogenization proportion and the concentrations at the two end points on the second target line segment, determination of the homogenization concentration can be achieved, and homogenization of detection results of different detection equipment finally can be achieved.

In step 1610, the actually measured absorbance is absorbance obtained by detecting the test sample by the test equipment, and based on the absorbance and the standard curve, corresponding concentration can be obtained; however, based on the concentration determined on the basis of the standard curve (namely, a relationship curve between absorbance and concentration) corresponding to the test equipment, this detection result is not the homogenization concentration.

In the embodiments of the present disclosure, in order to achieve homogenization of concentration, the first straight line segment combination corresponding to the detection equipment and the second straight line segment combination corresponding to the reference equipment need to be used, and the two straight line segment combinations need to be established in advance in a first time of application; in subsequent application process, they can be directly applied based on the established straight line segment combinations. Therefore, the first straight line segment combination and the second straight line segment combination need to be established first before step 1610.

As an optional embodiment, before step S1610, the method further may include a step of determining the number of comparison samples, which will be described in detail below with reference to FIG. 7 to FIG. 9.

Next implementation modes of the first straight line segment combination and the second straight line segment combination are introduced.

As an optional embodiment, before step 1610, the method further may include: acquiring a plurality of comparison samples (a series of samples with at least two or more different concentrations); detecting a first absorbance of each comparison sample by the test equipment, and determining a first concentration of each comparison sample based on the first absorbance of each comparison sample and a preset first standard curve, the preset first standard curve being used to characterize a relationship between the absorbance of the test equipment and the concentration; generating the first straight line segment combination according to the first absorbance of each comparison sample and the first concentration of each comparison sample; detecting a second absorbance of each comparison sample by the reference equipment, and determining a second concentration of each comparison sample based on the second absorbance of each comparison sample and a preset second standard curve, the preset second standard curve being used to characterize a relationship between the absorbance of the reference equipment and the concentration; and generating a second straight line segment combination according to the second absorbance of each comparison sample and the second concentration of each comparison sample.

In such embodiment, the number of comparison samples can be determined according to practical homogenization requirements. The greater the number of comparison samples with different concentrations is, the more the detection range of the whole standard curve can be covered, and the more a line obtained by sequentially connecting the coordinate points according to the magnitude of concentrations is overlapped with the standard curve.

As an optional embodiment, the generating the first straight line segment combination according to the first absorbance of each comparison sample and the first concentration of each comparison sample may include: determining a first coordinate point corresponding to each comparison sample according to the first absorbance and the first concentration of each comparison sample; determining an arrangement order of the first coordinate points corresponding to the respective comparison samples; and connecting the first coordinate points corresponding to the respective comparison samples in sequence according to the arrangement order of the first coordinate points corresponding to the respective comparison samples, to generate the first straight line segment combination.

In such an embodiment, the first coordinate points may be arranged in an order from low concentration to high concentration or in an order from high concentration to low concentration. The first absorbance may serve as the abscissa of the first coordinate point, and the first concentration may serve as the ordinate of the first coordinate point. Certainly, it is also feasible that the first absorbance serves as an ordinate and the first concentration serves as abscissas, which is not limited herein.

As an optional embodiment, the generating the second straight line segment combination according to the second absorbance of each comparison sample and the second concentration of each comparison sample includes: determining a second coordinate point corresponding to each comparison sample according to the second absorbance and the second concentration of each comparison sample; determining an arrangement order of the second coordinate points corresponding to the respective comparison samples, the arrangement order of the second coordinate points being corresponding to the arrangement order of the first coordinate points; and connecting the second coordinate points corresponding to the respective comparison samples in sequence according to the arrangement order of the second coordinate points corresponding to the respective comparison samples, to generate the second straight line segment combination.

In such an embodiment, the second coordinate points may be arranged in an order from low concentration to high concentration or in an order from high concentration to low concentration, i.e., an order corresponding to the arrangement order of the first coordinate points. The second absorbance may serve as the abscissa of the second coordinate point, and the second concentration may serve as the ordinate of the second coordinate point. Certainly, it is also feasible that the second absorbance serves as an ordinate and the second concentration serves as abscissas, which is not limited herein.

In some embodiments, a plurality of comparison samples obtained by calculating the first standard curve and the second standard curve are combined together, and then subjected to duplicate detection by the test equipment or the reference equipment, and if the absorbance values obtained from the detection are the same, the detection data with the same absorbance is combined as one piece of detection data.

It can be seen from the above embodiments that since the first straight line segment combination and the second straight line segment combination are both obtained by detecting the same comparison samples, the points on each line segment on the first straight line segment combination and the points on each line segment on the second straight line segment combination have a one-to-one correspondence.

Next, a determination process of the first straight line segment combination and the second straight line segment combination is described by way of a specific example, and in the following description, reference should be made to FIG. 17 to FIG. 20.

n comparison samples (i.e., a series of samples with at least 2 or more different concentrations) (n≥2) are taken and measured by using the reference equipment (identified as B) to obtain the absorbances, recorded as $$x_0^B, x_1^B, x_2^B, \cdots, x_{n-3}^B, x_{n-2}^B, x_{n-1}^B.$$

Corresponding concentrations $$y_0^B, y_1^B, y_2^B, \cdots, y_{n-3}^B, y_{n-2}^B, y_{n-1}^B$$

can be obtained using the absorbance-concentration curve (i.e., the standard curve $L_B$ of the reference equipment) used by the reference equipment. In the detection of the reference equipment, coordinate points of the comparison samples with absorbance as abscissa and concentration as ordinate are recorded as: $B_0$, $B_1$, $B_2$, . . . , $B_{n-3}$, $B_{n-2}$, $B_{n-1}$, and the absorbances and concentrations of the coordinate points of the n comparison samples are as shown in Table 2.

TABLE 2

| Coordinate points of comparison sample of reference equipment | $B_0$ | $B_1$ | $B_2$ | ... | $B_{n-3}$ | $B_{n-2}$ | $B_{n-1}$ |
|---|---|---|---|---|---|---|---|
| Absorbance | $x_0^B$ | $x_1^B$ | $x_2^B$ | ... | $x_{n-3}^B$ | $x_{n-2}^B$ | $x_{n-1}^B$ |
| Concentration | $y_0^B$ | $y_1^B$ | $y_2^B$ | ... | $y_{n-3}^B$ | $y_{n-2}^B$ | $y_{n-1}^B$ |

In the foregoing cases 1 and 3: the reference equipment performs the detection by the non-competitive method, and a continuous line segment formed by coordinate points of the n comparison samples of the reference equipment is recorded as $l_B$ (i.e., the second straight line segment combination), as shown by $l_B$ in FIG. 17 and FIG. 19. The abscissa and the ordinate of a point on $l_B$ have the following relationship:

$$x_0^B < x_1^B < x_2^B < \cdots < x_{n-3}^B < x_{n-2}^B < x_{n-1}^B$$

$$y_0^B < y_1^B < y_2^B < \cdots < y_{n-3}^B < y_{n-2}^B < y_{n-1}^B$$

Figure 20:
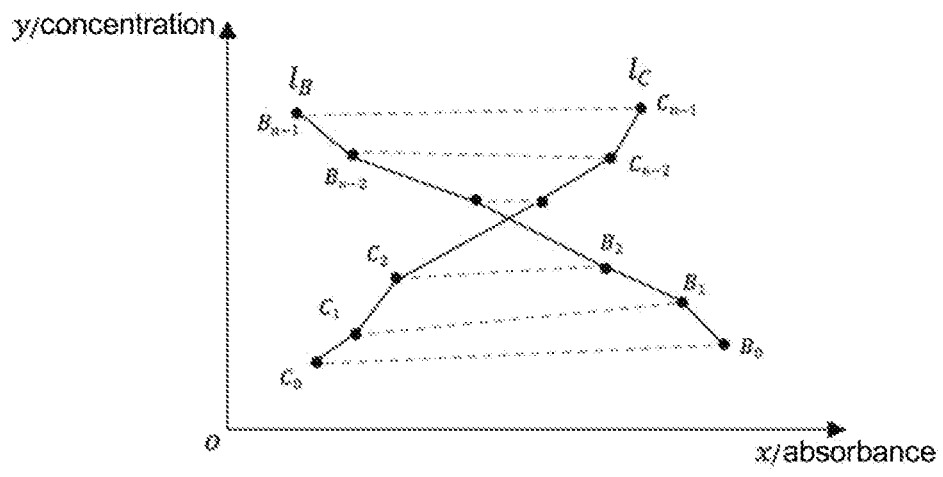
FIG. 20 is a fourth exemplary diagram of a straight line segment combination of absorbance and concentration provided in an embodiment in another aspect of the present disclosure.

In the cases 2 and 4: the reference equipment performs the detection by the competitive method, and a continuous line segment formed by coordinate points of the n comparison samples of the reference equipment is recorded as $l_B$ (i.e., the second straight line segment combination), as shown by $l_B$ in FIG. 18 and FIG. 20. The abscissa and the ordinate of a point on $l_B$ have the following relationship:

$$x_0^B > x_1^B > x_2^B > \cdots > x_{n-3}^B > x_{n-2}^B > x_{n-1}^B$$

$$y_0^B < y_1^B < y_2^B < \cdots < y_{n-3}^B < y_{n-2}^B < y_{n-1}^B$$

The n comparison samples arranged in an order from small concentration to large concentration are re-detected by the test equipment (identified as C), and the measured absorbances are recorded as $$x_0^C, x_1^C, x_2^C, \cdots, x_{n-3}^C, x_{n-2}^C, x_{n-1}^C$$

Corresponding concentrations $$y_0^C, y_1^C, y_2^C, \cdots, y_{n-3}^C, y_{n-2}^C, y_{n-1}^C$$

can be obtained using the absorbance-concentration curve (i.e., the standard curve $L_C$ of the test equipment) used by the test equipment. In the detection of the test equipment, coordinate points of the comparison samples with absorbance as abscissa and concentration as ordinate are recorded as: $C_0$, $C_1$, $C_2$, . . . , $C_{n-3}$, $C_{n-2}$, $C_{n-1}$, and the absorbances and concentrations of the coordinate points of the n comparison samples are as shown in Table 3.

TABLE 3

| Coordinate points of comparison sample of test equipment | $C_0$ | $C_1$ | $C_2$ | ... | $C_{n-3}$ | $C_{n-2}$ | $C_{n-1}$ |
|---|---|---|---|---|---|---|---|
| Absorbance | $x_0^C$ | $x_1^C$ | $x_2^C$ | ... | $x_{n-3}^C$ | $x_{n-2}^C$ | $x_{n-1}^C$ |
| Concentration | $y_0^C$ | $y_1^C$ | $y_2^C$ | ... | $y_{n-3}^C$ | $y_{n-2}^C$ | $y_{n-1}^C$ |

In the cases 1 and 4: the test equipment performs the detection by the non-competitive method, and a continuous line segment formed by coordinate points of the n comparison samples of the test equipment is recorded as $l_C$ (i.e., the first straight line segment combination), as shown by $l_C$ in FIG. 17 and FIG. 20. The abscissas and the ordinates of points on $l_C$ have the following relationship:

$$x_0^C < x_1^C < x_2^C < \cdots < x_{n-3}^C < x_{n-2}^C < x_{n-1}^C$$

$$y_0^C < y_1^C < y_2^C < \cdots < y_{n-3}^C < y_{n-2}^C < y_{n-1}^C$$

In the cases 2 and 3: the test equipment performs the detection by the competitive method, and a continuous line segment formed by coordinate points of the n comparison samples of the test equipment is recorded as $l_C$, as shown by $l_C$ in FIG. 18 and FIG. 19. The abscissas and the ordinates of points on $l_C$ have the following relationship:

$$x_0^C > x_1^C > x_2^C > \cdots > x_{n-3}^C > x_{n-2}^C > x_{n-1}^C$$

$$y_0^C < y_1^C < y_2^C < \cdots < y_{n-3}^C < y_{n-2}^C < y_{n-1}^C$$

That is, four possible first straight line segment combinations ($l_C$) and second straight line segment combinations ($l_B$) as shown in FIG. 17, FIG. 18, FIG. 19, and FIG. 20 may be eventually obtained.

For the first straight line segment combination, coordinates of the coordinate points $$C_0, C_1, \ldots, C_{n-2}, C_{n-1} : C_0(x_0^C, y_0^C), C_{n-2}(x_{n-2}^C, y_{n-2}^C), C_{n-1}(x_{n-1}^C, y_{n-1}^C)$$

are known.

Then, for any absorbance $x^C$ measured on the test equipment, $y^C$ denotes concentration obtained from $x^C$ according to a certain line segment on the first straight line segment combination.

When $$x_0^C < x^C < x_1^C, y^C = \frac{y_1^C - y_0^C}{x_1^C - x_0^C}\left(x^C - x_0^C\right) + y_0^C.$$

By that analogy, when $$x_{n-2}^C < x^C < x_{n-1}^C, y^C = \frac{y_{n-1}^C - y_{n-2}^C}{x_{n-1}^C - x_{n-2}^C}\left(x^C - x_{n-2}^C\right) + y_{n-2}^C.$$

For the second straight line segment combination, coordinates of the coordinate points $$B_0, B_1, \ldots, B_{n-2}, B_{n-1} : B_0\left(x_0^B, y_0^B\right), B_{n-2}\left(x_{n-2}^B, y_{n-2}^B\right), B_{n-1}\left(x_{n-1}^B, y_{n-1}^B\right)$$

are known.

Then, for any absorbance $x^B$ measured on the reference equipment, $y^B$ denotes concentration obtained from $x^B$ according to a certain line segment on the second straight line segment combination.

When $$x_0^B < x^B < x_1^B, y^B = \frac{y_1^B - y_0^B}{x_1^B - x_0^B}\left(x^B - x_0^B\right) + y_0^B.$$

By that analogy, when $$x_{n-2}^B < x^B < x_{n-1}^B, y^B = \frac{y_{n-1}^B - y_{n-2}^B}{x_{n-1}^B - x_{n-2}^B}\left(x^B - x_{n-2}^B\right) + y_{n-2}^B.$$

It can be seen from the above description of the first straight line segment combination and the second straight line segment combination that the first straight line segment combination and the second straight line segment combination both include a plurality of line segments, and the points on the line segments on the first straight line segment combination and the second straight line segment combination have a one-to-one correspondence therebetween. Based on the characteristics of the first straight line segment combination and the second straight line segment combination, the homogenization of the detection result can be realized through calculation.

In step 1620, the first target line segment corresponding to the actually measured absorbance is determined, and since the actually measured absorbance is the absorbance measured on the test equipment, the first target line segment is a certain line segment located on the first straight line segment combination.

When determining the first target line segment, the actually measured absorbance may be compared with the absorbance at an end point of each line segment on the first straight line segment combination or with the data in Table 2 described above, and a line segment constituted by two absorbances that are closest to the actually measured absorbance is determined as the first target line segment.

After determining the first target line segment, in step 1630, the homogenization proportion is determined according to an absorbance at the first end point of the first target line segment, an absorbance at the second end point of the first target line segment, and the actually measured absorbance. The homogenization proportion is used to convert, through calculation, the concentration corresponding to the actually measured absorbance into the homogenization concentration As an optional embodiment, the homogenization proportion is expressed as:

$$r = \frac{x_E^C - x_{j-1}^C}{x_j^C - x_{j-1}^C},$$

where $$x_E^C$$

is the actually measured absorbance, $$x_{j-1}^C$$

is the absorbance at the first end point of the first target line segment, and $$x_j^C$$

is the absorbance at the second end point of the first target line segment.

Further, in step 1640, the second target line segment corresponding to the first target line segment is determined. As described in conjunction with the foregoing embodiments, the second target line segment is a line segment on the second straight line segment combination.

As an optional embodiment, the first end point of the first target line segment and the first end point of the second target line segment characterize the absorbances and the concentrations corresponding to the same index of the same comparison sample; and the second end point of the first target line segment and the second end point of the second target line segment characterize the absorbances and the concentrations corresponding to the same index of the same comparison sample.

As described in the foregoing embodiments, the points on the line segments on the first straight line segment combination and the second straight line segment combination have a one-to-one correspondence, and the correspondence can be quickly determined by the samples corresponding to the end points of the line segments.

For example, two end points of the first target line segment are data corresponding to sample A and sample B respectively, and then on the second straight line segment combination, data of sample A and sample B is found first, and then a line segment formed by the data of sample A and sample B is determined as the second target line segment.

Further, in step 1650, the homogenization concentration corresponding to the actually measured absorbance is determined according to the concentration at the first end point of the second target line segment, the concentration at the second end point of the second target line segment, and homogenization proportion.

For ease of understanding, an implementation mode of step 1630 to step 1650 is described below with reference to the drawings, wherein the principle of realizing homogenization concentration by homogenization proportion will be explained.

Assuming that absorbance detection is now performed on a new sample E using the test equipment, and the absorbance of the new sample is detected as $$x_E^C,$$

it can be judged from the preceding Table 2 which interval $$x_E^C$$

and assuming $$x_{j-1}^C < x_E^C < x_j^C, x_E^C$$

is in a j-th interval $[C_{j-1}C_j]$ of the standard curve of the test equipment.

$$x_E^C$$

is substituted into the four cases of FIG. 17, FIG. 18, FIG. 19, and FIG. 20 for analysis.

Figure 21:
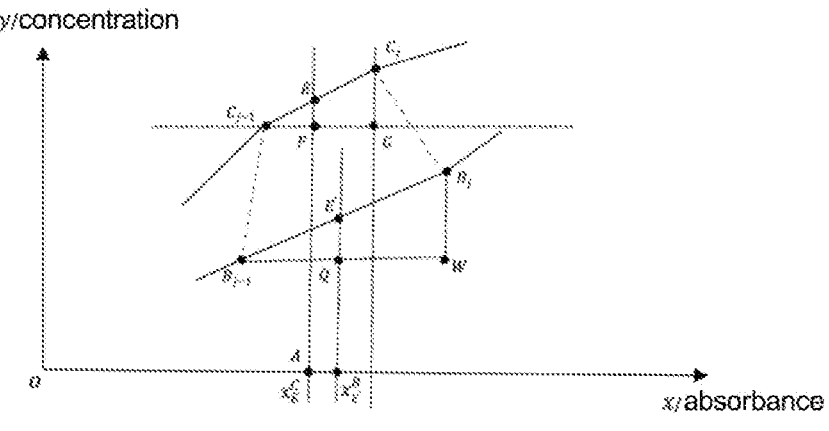
FIG. 21 is a first exemplary diagram of homogenization principle provided in an embodiment in another aspect of the present disclosure.
Figure 22:
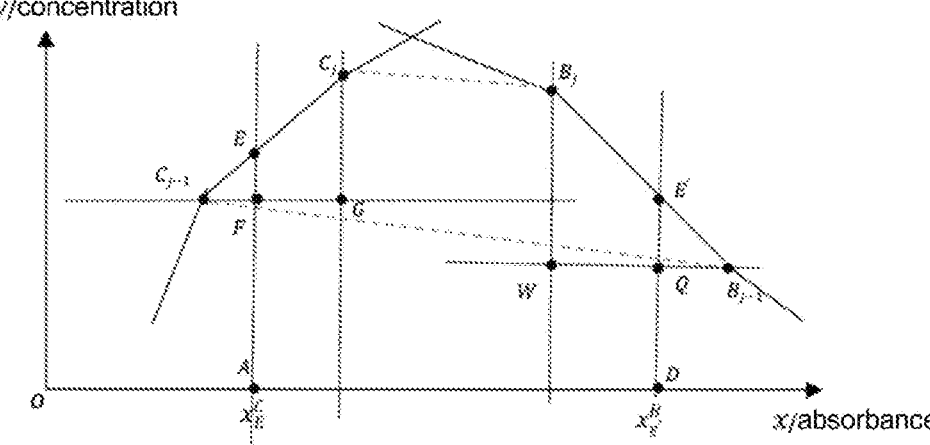
FIG. 22 is a second exemplary diagram of the homogenization principle provided in an embodiment in another aspect of the present disclosure.

Case 1 and case 2 can be considered as one case, as shown in FIG. 21. Case 3 and case 4 can be considered as one case, as shown in FIG. 22.

A straight line is drawn to pass through a point, is parallel to the y-axis and intersects the x-axis at point A. A straight line is drawn to pass through a point $C_{j-1}$, is parallel to the x-axis and intersects EA at point F. A straight line is drawn to pass through a point $C_j$, is parallel to the y-axis and intersects, at point G, the straight line where $C_{j-1}F$ is located.

Assuming that the point E on the sample line segment of two adjacent concentration comparison samples of the test equipment is corresponding to point E' on the sample line segment of two corresponding adjacent concentration comparison samples of the reference equipment, a straight line is drawn to pass through a point E', is parallel to the y-axis and intersects the x-axis at point D. A straight line is drawn to pass through a point $B_{j-1}$, is parallel to the x-axis and intersects the E'D at point Q. A straight line is drawn through a point $B_j$, is parallel to the y-axis and intersects, at point W, a straight line where the $B_{j-1}Q$ is located.

A proportion (i.e. homogenization proportion) of a position of the new sample coordinate point E on the line segment $C_{j-1}C_j$ is denoted by r. As points on the line segment $C_{j-1}C_j$ and the line segment $B_{j-1}B_j$ have a one-to-one correspondence, a proportion of a position of the point E' on the line segment $B_{j-1}B_j$ should also be r, i.e., $$r = \frac{C_{j-1}E}{C_{j-1}C_j} = \frac{B_{j-1}E'}{B_{j-1}B_j}.$$

For a determination mode of the final homogenization concentration, method 1 (coordinate method):

triangle $C_{j-1}EF$ is similar to triangle $C_{j-1}C_jG$, and it can be known from the triangle similarity theorem (the triangle $C_{j-1}EF$ is similar to the triangle $C_{j-1}C_jG$) that:

$$\frac{C_{j-1}E}{C_{j-1}C_j} = \frac{C_{j-1}F}{C_{j-1}G}; C_{j-1}F = x_E^C - x_{j-1}^C, C_{j-1}G = x_j^C - x_{j-1}^C,$$

$$\text{then } r = \frac{C_{j-1}F}{C_{j-1}G} = \frac{x_E^C - x_{j-1}^C}{x_j^C - x_{j-1}^C}.$$

It can be known from the triangle similarity theorem (the triangle $C_{j-1}EF$ is similar to the triangle $C_{j-1}C_jG$) that:

$$EF = r \times C_jG = r\left(y_j^C - y_{j-1}^C\right);$$

then the ordinate of point E is:

$$y_E^C = y_{j-1}^C + r\left(y_j^C - y_{j-1}^C\right).$$

As points on the line segment $C_{j-1}C_j$ and the line segment $B_{j-1}B_j$ have a one-to-one correspondence, $$\frac{C_{j-1}E}{C_{j-1}C_j} = \frac{B_{j-1}E'}{B_{j-1}B_j};$$

and the ordinate of point $$y_{E'}^B = y_{j-1}^B + r\left(y_j^B - y_{j-1}^B\right), y_{E'}^B$$

is a detection result after the homogenization.

In some embodiments, if it is desired to know the detection difference of the test equipment and the reference equipment for the detection of the same item of the same sample, a difference value may be calculated:

$$\Delta y = y_{E'}^B - y_E^C = r\left(y_j^B - y_j^C\right) + (1 - r)\left(y_{j-1}^B - y_{j-1}^C\right).$$

For a determination mode of the final homogenization concentration, method 2 (straight line formula method):

$$x_{E'}^B = x_{j-1}^B + r\left(x_j^B - x_{j-1}^B\right)$$

A value of $$x_{E'}^B$$

is substituted into an expression of line segment $B_{j-1}B_j$:

$$y_{E'}^B = \frac{y_j^B - y_{j-1}^B}{x_j^B - x_{j-1}^B}\left(x_{E'}^B - x_{j-1}^B\right) + y_{j-1}^B$$

then:

$$y_{E'}^B = \frac{y_j^B - y_{j-1}^B}{x_j^B - x_{j-1}^B}\left[x_{j-1}^B + r\left(x_j^B - x_{j-1}^B\right) - x_{j-1}^B\right] + y_{j-1}^B = y_{j-1}^B + r\left(y_j^B - y_{j-1}^B\right)$$

It can be seen that the expressions of $$y_{E'}^B$$

obtained by the method 1 and the method 2 are the same, and by substituting $$x_{E'}^B$$

into the standard curve, the accurate homogenization concentration after conversion on the curve can be calculated.

The technical solution provided in the embodiments of the present disclosure is also feasible after being practically applied, and some numerical values in practical applications are introduced below by way of example.

Assuming that the absorbance is measured for 7 comparison samples using the reference equipment and the test equipment, and concentrations found according to respective concentration-absorbance curves are as shown in Table 4 and Table 5, wherein Table 4 shows, for 7 comparison samples, absorbance detection results of the reference equipment and corresponding concentrations, and Table 5 shows, for 7 comparison samples, absorbance detection results of the test equipment and corresponding concentrations.

TABLE 4

| Coordinate points of comparison sample of reference equipment | $B_0$ | $B_1$ | $B_2$ | $B_3$ | $B_4$ | $B_5$ | $B_6$ |
|---|---|---|---|---|---|---|---|
| Absorbance | 0.10 | 0.15 | 0.23 | 0.42 | 0.55 | 0.68 | 0.70 |
| Concentration | 0.50 | 0.65 | 0.72 | 0.80 | 0.88 | 1.10 | 1.30 |

TABLE 5

| Coordinate points of comparison sample of test equipment | $C_0$ | $C_1$ | $C_2$ | $C_3$ | $C_4$ | $C_5$ | $C_6$ |
|---|---|---|---|---|---|---|---|
| Absorbance | 0.24 | 0.30 | 0.33 | 0.45 | 0.49 | 0.58 | 0.60 |
| Concentration | 0.36 | 0.48 | 0.50 | 0.57 | 0.61 | 0.70 | 0.77 |

It is detected using the test equipment that the absorbance of a to-be-detected sample is $$x_E^C = 0.478.$$

Figure 23:
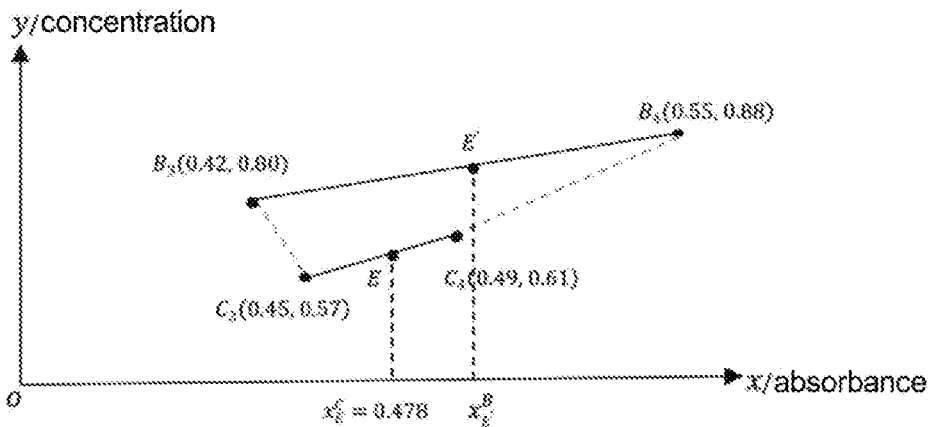
FIG. 23 is an exemplary diagram of homogenization data provided in an embodiment in another aspect of the present disclosure.

According to Table 5, a fourth interval where the absorbance 0.478 is located on the first straight line segment combination ($l_C$) can be found, and coordinates of end points of the interval are $C_3(0.45, 0.57)$, $C_4(0.49, 0.61)$. Coordinates of end points of the fourth interval on the second straight line segment combination ($l_B$) are queried according to Table 4: $B_3(0.42, 0.80)$, $B_4(0.55, 0.88)$, as shown in FIG. 23.

It may be obtained by substituting the above actual coordinate values into the formula of $$y_E^C, y_{E'}^B,$$

and $\Delta y$ that:

$$r = \frac{0.478 - 0.45}{0.49 - 0.45} = 0.7.$$

Ordinate of $$y_E^C = 0.57 + 0.7 \times (0.61 - 0.57) = 0.598.$$

Ordinate of $$y_{E'}^B = 0.80 + 0.7 \times (0.88 - 0.80) = 0.856.$$

The difference value between the reference equipment and the test equipment for detecting the above to-be-detected sample is $$\Delta y = y_{E'}^B - y_E^C = 0.856 - 0.598 = 0.258.$$

2.2 Comparison Sample Number Determination Method

As described above, before the step S1610 of acquiring the actually measured absorbance in FIG. 16, the method for homogenization conversion of the same index detected by different equipment provided in the exemplary embodiments of the present disclosure further may include a step of determining number of comparison samples.

A brief description is given below with reference to FIG. 7, and the method for determining number of comparison samples may include:

step 710: determining a plurality of first comparison samples corresponding to the test equipment according to the first standard curve and a preset error condition. The first standard curve is used to characterize the relationship between the absorbance of the test equipment and the concentration;

step 720: determining a plurality of second comparison samples corresponding to the reference equipment according to the second standard curve and the preset error condition. The second standard curve is used to characterize the relationship between the absorbance of the reference equipment and the concentration; and step 730: determining a plurality of final comparison samples according to the plurality of first comparison samples and the plurality of second comparison samples.

In the embodiments of the present disclosure, the plurality of first comparison samples corresponding to the test equipment are determined according to the first standard curve and the preset error condition, and the plurality of second comparison samples corresponding to the reference equipment are determined according to the second standard curve and the preset error condition; and further, a plurality of final comparison samples are determined according to the plurality of first comparison samples and the plurality of second comparison samples, thus achieving the scientific selection of the comparison samples.

In some embodiments, an execution order of step 710 and step 720 is not limited, that is, it is feasible that the plurality of first comparison samples are determined first, and it is also feasible that the plurality of second comparison samples are determined first, which is not limited herein.

It can be understood that, for a more detailed step of determining the number of comparison samples, reference is made to the detailed description in FIG. 7 to FIG. 9, which will not be repeated herein again.

2.3 Index Homogenization (Straight Line) Conversion Device

Figure 24:
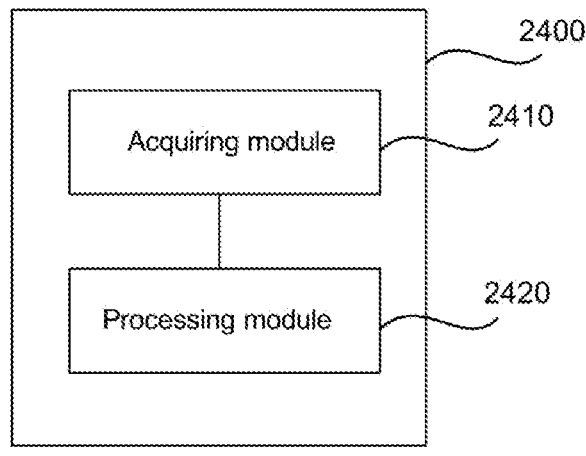
FIG. 24 is a structural schematic diagram of a device for homogenization conversion of the same index detected by different equipment provided in an embodiment in another aspect of the present disclosure.

Based on the same inventive concept, referring to FIG. 24, an embodiment in another aspect of the present disclosure further provides a device 2400 for homogenization conversion of the same index detected by different equipment, which may include: an acquiring module 2410 and a processing module 2420.

The acquiring module 2410 can be configured to acquire an actually measured absorbance, wherein the actually measured absorbance is absorbance obtained by detecting a test sample by the test equipment. The processing module 2420 can be configured to determine a first target line segment corresponding to the actually measured absorbance, wherein the first target line segment is a line segment on a first straight line segment combination, the first straight line segment combination is a line segment combination obtained by detecting a plurality of comparison samples by the test equipment, and each coordinate point is corresponding to the absorbance and concentration of one comparison sample; determine a homogenization proportion according to an absorbance at the first end point of the first target line segment, an absorbance at the second end point of the first target line segment, and the actually measured absorbance, wherein the homogenization proportion is used to convert the concentration corresponding to the actually measured absorbance into a homogenization concentration; determine a second target line segment corresponding to the first target line segment, wherein the second target line segment is a line segment on a second straight line segment combination, the second straight line segment combination is a line segment combination obtained by detecting a plurality of comparison samples by the reference equipment, and each coordinate point is corresponding to the absorbance and concentration of one comparison sample; and determine homogenization concentration corresponding to the actually measured absorbance according to the concentration at the first end point of the second target line segment, the concentration at the second end point of the second target line segment, and the homogenization proportion.

In the embodiments of the present disclosure, the acquiring module 2410 further may be configured to: acquire the plurality of comparison samples. The processing module 2420 further may be configured to: detect a first absorbance of each comparison sample by the test equipment, and determining a first concentration of each comparison sample based on the first absorbance of each comparison sample and a preset first standard curve, the preset first standard curve being used to characterize the relationship between the absorbance of the test equipment and the concentration; generate the first straight line segment combination according to the first absorbance of each comparison sample and the first concentration of each comparison sample; detect a second absorbance of each comparison sample by the reference equipment, and determine a second concentration of each comparison sample based on the second absorbance of each comparison sample and a preset second standard curve, the preset second standard curve being used to characterize the relationship between the absorbance of the reference equipment and the concentration; and generate a second straight line segment combination according to the second absorbance of each comparison sample and the second concentration of each comparison sample.

In the embodiments of the present disclosure, the processing module 2420 specifically may be configured to: determine a first coordinate point corresponding to each comparison sample according to the first absorbance and the first concentration of each comparison sample; determine an arrangement order of the first coordinate points corresponding to the respective comparison samples; and connect the first coordinate points corresponding to the respective comparison samples in sequence according to the arrangement order of the first coordinate points corresponding to the respective comparison samples, to generate the first straight line segment combination.

In the embodiments of the present disclosure, the processing module 2420 specifically may be configured to: determine a second coordinate point corresponding to each comparison sample according to the second absorbance and the second concentration of each comparison sample; determine an arrangement order of the second coordinate points corresponding to the respective comparison samples, the arrangement order being an order corresponding to the arrangement order of the first coordinate points; and connect the second coordinate points corresponding to the respective comparison samples in sequence according to the arrangement order of the second coordinate points corresponding to the respective comparison samples, to generate the second straight line segment combination.

2.4 Comparison Sample Number Determination Device

Based on the same inventive concept, referring to FIG. 11, the device 2400 for homogenization conversion of the same index detected by different equipment in exemplary embodiments of the present disclosure further may include: a comparison sample number determination device 1100, wherein the comparison sample number determination device 1100 is configured to determine the number of comparison samples before the step 1610 of acquiring an actually measured absorbance as in FIG. 16.

The comparison sample number determination device 1100 may include: a first determination module 1110, a second determination module 1120, and a third determination module 1130.

The index homogenization conversion device further includes: a comparison sample number determination device, configured to determine the number of comparison samples before acquiring the actually measured absorbance.

The comparison sample number determination device may include:

a first determination module, configured to determine a plurality of first comparison samples corresponding to the test equipment according to the first standard curve and a preset error condition, wherein the first standard curve is used to characterize the relationship between the absorbance of the test equipment and the concentration;

a second determination module, configured to determine a plurality of second comparison samples corresponding to the reference equipment according to the second standard curve and the preset error condition, wherein the second standard curve is used to characterize the relationship between the absorbance of the reference equipment and the concentration; and a third determination module, configured to determine the plurality of final comparison samples according to the plurality of first comparison samples and the plurality of second comparison samples.

It should be noted that the index homogenization device 2400 provided in the present disclosure is corresponding to the index homogenization method provided in the present disclosure. For conciseness of the description, reference can be made to contents in the part of the index homogenization method for the same or similar parts, which is not repeated herein again.

Various modules in the above index homogenization device 2400 may be wholly or partially implemented by software, hardware, and a combination thereof. Various modules above can be embedded, in a hardware form, or independent of a processor in a server, and may also be stored in a memory in the server in a software form, so that the processor invokes and executes operations corresponding to various modules above. The processor may be a central processing unit (CPU), a microprocessor, a single chip microcomputer, etc.

Figure 25:
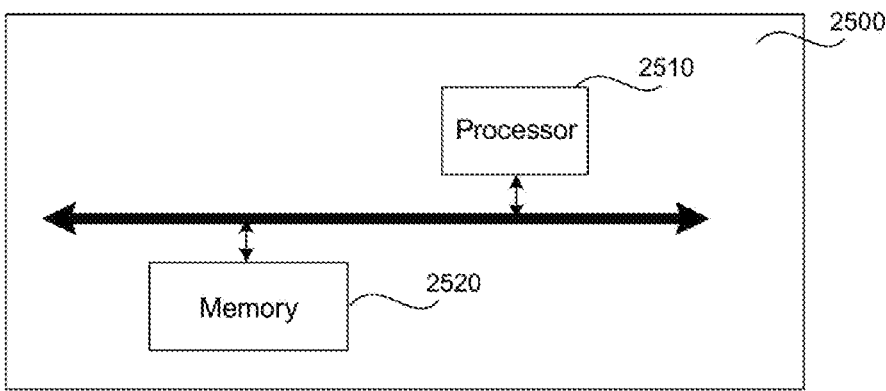
FIG. 25 is a structural schematic diagram of electronic equipment provided in an embodiment of the present disclosure.

Referring to FIG. 25, an embodiment of the present disclosure further provides electronic equipment 2500, wherein the electronic equipment 2500 may serve as a hardware running environment of the foregoing homogenization method of the detection equipment as mentioned above. It includes a processor 2510 and a memory 2520, and communication between the processor 2510 and the memory 2520 can be realized via a communication bus.

The memory 2520 stores instructions executable by the processor 2510, and the instructions are executed by the processor 2510, so as to enable the processor 2510 to execute the index homogenization conversion method as in any possible implementation mode in the one aspect as mentioned above and/or the method for homogenization conversion of the same index detected by different equipment as in any possible implementation mode in another aspect as mentioned above.

It can be understood that the structure shown in FIG. 25 is merely exemplary, while the electronic equipment further may include more or less components than those shown in FIG. 25, or is configured in a way different from that shown in FIG. 25.

It should also be noted that the electronic equipment 2500 provided in the present embodiment may be implemented by electronic equipment with data processing functions, such as a server or a host.

Computer programs are stored in the computer-readable storage medium, the computer programs are run by a computer, and when the computer programs are run by the computer, the index homogenization conversion method in any possible implementation mode in the one aspect as mentioned above and/or the above method for homogenization conversion of the same index detected by different equipment in any possible implementation mode in another aspect as mentioned above is executed.

The present embodiment further provides a computer-readable storage medium, such as a floppy disk, an optical disk, a hard disk, a flash memory, a U disk, and an SD (secure digital memory card), an MMC (multimedia card), etc. One or more programs for implementing the described various steps are stored in the computer-readable storage medium. The one or more programs may be executed by one or more processors, so as to implement the method for homogenization conversion of the same index detected by different equipment in the foregoing embodiments, which is not repeated herein again.

In the embodiments provided in the present disclosure, it should be understood that the device and the method disclosed may be implemented in other manners. The device embodiments described in the above are merely exemplary, for example, the units are merely divided according to logical functions, but they may be divided in other manners in practical implementation, for another example, multiple units or components may be combined or may be integrated into another system, or some features may be omitted, or not executed. In addition, mutual coupling or direct coupling or communication connection as shown or discussed may be indirect coupling or communication connection via some communication interfaces, means or units, and may be in an electrical form, a mechanical form or other forms.

In addition, the units described as separate components may be separated physically or not. The components shown as units may be physical units or not, i.e., they may be located at one place or distributed onto multiple network units. The objective of the solution of the present embodiment may be realized by selecting part or all of the units thereof as actually required.

Besides, various functional modules in various embodiments of the present disclosure may be integrated together to form an independent part, or various modules may be present independently, or two or more of the modules may be integrated into an independent part.

Relationship terms such as first, second, and the like are used herein only for distinguishing one entity or operation from another entity or operation, while it is not necessarily required or implied that these entities or operations have any such practical relationship or order.

The above are merely embodiments of the present disclosure and not intended to limit the scope of protection of the present disclosure. For those skilled in the art, various modifications and variations could be made to the present disclosure. Any modifications, equivalent substitutions, improvements and so on, made within the spirit and principle of the present disclosure, should be covered within the scope of protection of the present disclosure.

The technology of the present disclosure further may be configured as follows.

Item 1. A comparison sample determination method, including:

determining a plurality of first comparison samples corresponding to the test equipment according to the first standard curve and a preset error condition, wherein the first standard curve is used to characterize relationship between the signal value of the test equipment and the concentration, and the signal value comprises absorbance and luminescence value;

determining a plurality of second comparison samples corresponding to the reference equipment according to the second standard curve and the preset error condition, wherein the second standard curve is used to characterize the relationship between the signal value of the reference equipment and the concentration, and the signal value includes absorbance and luminescence value; and determining a plurality of final comparison samples according to the plurality of first comparison samples and the plurality of second comparison samples.

Item 2. The comparison sample determination method according to item 1, wherein the determining a plurality of first comparison samples corresponding to the test equipment according to the first standard curve and a preset error condition includes:

acquiring the lowest concentration value detectable by the test equipment; determining a starting coordinate point on the first standard curve according to the lowest concentration value detectable by the test equipment; and determining another coordinate point on the first standard curve through calculation, and determining the comparison samples corresponding to the plurality of first coordinate points as the first comparison samples;

determining a plurality of first coordinate points on the first standard curve based on the preset error condition and the starting coordinate point on the first standard curve, wherein on the first standard curve, difference between concentrations of coordinate points with the same signal value on any standard curve and straight line between two adjacent first coordinate points satisfies the preset error condition, the preset error condition being $$\left|\frac{x_C - x_D}{x_C}\right| \leq d,$$

where C is this coordinate point, D is a coordinate point having the same signal value as this coordinate point and located on a line segment constituted by the two adjacent first coordinate points, $x_C$ is a concentration value of the coordinate point C, $x_D$ is a concentration value of the coordinate point D, and d is a preset error value; and determining all comparison samples corresponding to the plurality of first coordinate points as the first comparison samples.

Item 3. The comparison sample determination method according to item 2, wherein the determining a plurality of first coordinate points on the first standard curve based on the preset error condition and the starting coordinate point on the first standard curve includes:

determining the plurality of first coordinate points on the first standard curve through a preset matlab algorithm based on the preset error condition and the starting coordinate point on the first standard curve.

Item 4. The comparison sample determination method according to item 2, wherein the comparison sample determination method further includes:

acquiring the highest concentration value detectable by the test equipment; determining an upper limit coordinate point on the first standard curve as the starting point according to the coordinate point with the highest concentration value detectable by the test equipment, and determining another coordinate point on the first standard curve through calculation; and determining the comparison samples corresponding to the plurality of first coordinate points as the first comparison samples.

Item 5. The comparison sample determination method according to item 1, wherein the determining a plurality of second comparison samples corresponding to the reference equipment according to the second standard curve and the preset error condition includes:

acquiring the lowest concentration value detectable by the reference equipment; determining a starting coordinate point on the second standard curve according to the lowest concentration value detectable by the reference equipment;

determining, as the second comparison samples, corresponding comparison samples calculated and obtained in sequence according to the starting coordinate point on the second standard curve; and determining a plurality of second coordinate points on the second standard curve based on the preset error condition and the starting coordinate point on the second standard curve, wherein on the second standard curve, difference between concentrations of coordinate points with the same signal value as this coordinate point and located on any line segment between two adjacent second coordinate points satisfies the preset error condition, the preset error condition being $$\left|\frac{x_E - x_F}{x_E}\right| \leq d,$$

where E is this coordinate point, F is a coordinate point having the same signal value as this coordinate point and located on a line segment constituted by the two adjacent second coordinate points, $x_E$ is a concentration value of the coordinate point E, $x_F$ is a concentration value of the coordinate point F, and d is a preset error value; and determining all comparison samples corresponding to the plurality of second coordinate points as the second comparison samples.

Item 6. The comparison sample determination method according to item 5, wherein the determining a plurality of second coordinate points on the second standard curve based on the preset error condition and the starting coordinate point on the second standard curve includes:

determining the plurality of second coordinate points on the second standard curve by a preset matlab algorithm, based on the preset error condition and the starting coordinate point on the second standard curve.

Item 7. The comparison sample determination method according to item 5, wherein the comparison sample determination method further includes:

acquiring the highest concentration value detectable by the reference equipment;

determining an upper limit coordinate point on the second standard curve as the starting point according to the coordinate point of the highest concentration value detectable by the reference equipment; and determining, as the second comparison samples, corresponding comparison samples calculated and obtained in sequence according to the upper limit coordinate point on the second standard curve.

Item 8. The comparison sample determination method according to item 1, wherein the determining a plurality of final comparison samples according to the plurality of first comparison samples and the plurality of second comparison samples includes:

determining identical comparison samples in the plurality of first comparison samples and the plurality of comparison samples;

performing de-duplication on the identical comparison samples to obtain a plurality of de-duplicated comparison samples;

detecting the plurality of de-duplicated comparison samples by the reference equipment or the test equipment, to obtain detection curves corresponding to the plurality of de-duplicated comparison samples;

determining similar comparison samples according to the detection curves, wherein coordinate points of the similar comparison samples on the detection curves are adjacent coordinate points, and a concentration difference between adjacent coordinate points is within a preset error range; and performing de-duplication on the similar comparison samples to obtain a plurality of final comparison samples.

Item 9. A comparison sample determination device, including:

a first determination module, configured to determine a plurality of first comparison samples corresponding to the test equipment according to a first standard curve and a preset error condition, wherein the first standard curve is used to characterize relationship between a signal value of test equipment and a concentration, and the signal value includes absorbance and luminescence value;

a second determination module, configured to determine a plurality of second comparison samples corresponding to reference equipment according to a second standard curve and the preset error condition, wherein the second standard curve is used to characterize relationship between a signal value of the reference equipment and a concentration, and the signal value include absorbance and luminescence value; and a third determination module, configured to determine a plurality of final comparison samples according to the plurality of first comparison samples and the plurality of second comparison samples.

Item 10. Electronic equipment, including:

a processor; and a memory in communication with the processor, wherein the memory stores instructions executable by the processor, and the instructions, when being executed by the processor, cause the processor to execute the comparison sample determination method according to any one of items 1 to 8.

Item 11. A computer-readable storage medium, wherein the computer-readable storage medium stores computer programs, and when the computer programs are run by a computer, the comparison sample determination method according to any one of items 1 to 8 is executed.

INDUSTRIAL APPLICABILITY

The present disclosure provides an index homogenization conversion method, and a method and a device for homogenization conversion of the same index detected by different equipment, electronic equipment, and a comparison sample determination method. The present disclosure provides a conversion method based on two modes of arc line and straight line (i.e., index homogenization arc line conversion method and index homogenization straight line conversion method) to realize homogenization conversion of detection results of different detection equipment, wherein the index homogenization arc line conversion method may include: acquiring an actually measured signal value; determining a concentration of the actually measured signal value on a first standard curve; obtaining a first target arc line segment of the first standard curve according to a first end point of the first standard curve and a second end point of the first standard curve, and obtaining a second target arc line segment of the first standard curve according to the first end point of the first standard curve and an end point corresponding to the test sample on the first standard curve; obtaining a third target arc line segment of a second standard curve according to a first end point of the second standard curve and a second end point of the second standard curve;

determining an arc length equation of a fourth target arc line segment according to the first target arc line segment, the second target arc line segment, and the third target arc line segment; and determining a homogenization concentration corresponding to the actually measured signal value according to the arc length equation of the fourth target arc line segment. The index homogenization straight line conversion method may include: acquiring an actually measured absorbance, wherein the actually measured absorbance is absorbance obtained by detecting a test sample by the test equipment; determining a first target line segment corresponding to the actually measured absorbance, wherein the first target line segment is a line segment on a first straight line segment combination, the first straight line segment combination is a line segment combination obtained by detecting a plurality of comparison samples by the test equipment, and each coordinate point is corresponding to the absorbance and concentration of one comparison sample; determining a homogenization proportion according to an absorbance at the first end point of the first target line segment, an absorbance at the second end point of the first target line segment, and the actually measured absorbance, wherein the homogenization proportion is used to convert the concentration corresponding to the actually measured absorbance into a homogenization concentration; determining a second target line segment corresponding to the first target line segment, wherein the second target line segment is a line segment on a second straight line segment combination, the second straight line segment combination is a line segment combination obtained by detecting a plurality of comparison samples by the reference equipment, and each coordinate point is corresponding to the absorbance and concentration of one comparison sample; and determining the homogenization concentration corresponding to the actually measured absorbance according to the concentration at the first end point of the second target line segment, the concentration at the second end point of the second target line segment, and the homogenization proportion. The above two index homogenization conversion methods are used for realizing the homogenization of detection results of different detection equipment. Besides, the present disclosure further provides a comparison sample determination method, including: determining a plurality of first comparison samples corresponding to test equipment according to a first standard curve and a preset error condition, wherein the first standard curve is used to characterize relationship between a signal value of the test equipment and a concentration, and the signal value includes absorbance and luminescence value; determining a plurality of second comparison samples corresponding to reference equipment according to a second standard curve and a preset error condition, wherein the second standard curve is used to characterize relationship between a signal value of the reference equipment and a concentration, and the signal value includes absorbance and luminescence value; and determining a plurality of final comparison samples according to the plurality of first comparison samples and the plurality of second comparison samples. This comparison sample determination method can be used for determining the number of comparison samples in the homogenization conversion of detection results of different detection equipment, so as to realize scientific selection of the comparison samples.

Besides, it can be understood that the index homogenization conversion method, and the method and device for homogenization conversion of the same index detected by different equipment, electronic equipment, and the comparison sample determination method of the present disclosure are reproducible, and applicable in a variety of industrial applications. For example, the index homogenization conversion method and the method and device for homogenization conversion of the same index detected by different equipment, the electronic equipment, and the comparison sample determination method in the present disclosure can be used in the technical field of detection equipment.

The invention claimed is:

1. An index homogenization conversion method, applied in a medical detection system comprising test equipment and reference equipment, comprising:

acquiring an actually measured signal value, wherein the actually measured signal value is a signal value obtained by detecting a test sample by the test equipment;

determining a corresponding concentration of the actually measured signal value on a first standard curve, wherein the first standard curve is a preset signal value-concentration relationship curve of the test equipment;

obtaining a first target arc line segment of the first standard curve according to a first end point of the first standard curve and a second end point of the first standard curve, and obtaining a second target arc line segment of the first standard curve according to the first end point of the first standard curve and an end point corresponding to the test sample on the first standard curve, wherein the first end point and the second end point of the first standard curve are signal values-concentrations corresponding to different comparison samples;

obtaining a third target arc line segment of a second standard curve according to a first end point of the second standard curve and a second end point of the second standard curve, wherein the second standard curve is a preset signal value-concentration relationship curve of the reference equipment, the first end point of the second standard curve and the first end point of the first standard curve are signal values-concentrations corresponding to a same comparison sample, and the second end point of the second standard curve and the second end point of the first standard curve are signal values-concentrations corresponding to the same comparison sample;

determining an arc length equation of a fourth target arc line segment according to the first target arc line segment, the second target arc line segment, and the third target arc line segment, wherein the fourth target arc line segment is an arc line segment from the first end point of the second standard curve to a corresponding end point of the test sample on the second standard curve;

determining a homogenization concentration corresponding to the actually measured signal value according to the arc length equation of the fourth target arc line segment; and outputting the homogenization concentration to realize homogenization of detection results of the test equipment and the reference equipment for the same index of the same sample, wherein before acquiring the actually measured signal, the method further comprises determining number of comparison samples through steps of:

determining a plurality of first comparison samples corresponding to the test equipment according to the first standard curve and a preset error condition, wherein the first standard curve is used to characterize a relationship between the signal value of the test equipment and the concentration, wherein the signal value comprises absorbance and luminescence value;

determining a plurality of second comparison samples corresponding to the reference equipment according to the second standard curve and the preset error condition, wherein the second standard curve is used to characterize a relationship between the signal value of the reference equipment and the concentration, wherein the signal value comprises absorbance and luminescence value; and determining a plurality of final comparison samples according to the plurality of first comparison samples and the plurality of second comparison samples.

2. The method according to claim 1, wherein the determining an arc length equation of a fourth target arc line segment according to the first target arc line segment, the second target arc line segment, and the third target arc line segment comprises:

determining a length relationship between an arc length of the fourth target arc line segment and an arc length of each target arc line segment according to respective arc lengths of the first target arc line segment, the second target arc line segment, and the third target arc line segment; and determining an arc length calculation equation of the fourth target arc line segment based on an arc length calculation formula and the length relationship.

3. The method according to claim 2, wherein the determining a homogenization concentration corresponding to the actually measured signal value according to the arc length calculation equation of the fourth target arc line segment comprises:

processing the arc length equation by a compound Simpson integral formula and a bisection method, and determining the homogenization concentration corresponding to the actually measured signal value.

4. The method according to claim 3, wherein the processing the arc length equation by a compound Simpson integral formula and a bisection method and determining the homogenization concentration corresponding to the actually measured signal value comprises:

converting the arc length equation by the compound Simpson integral formula to obtain a target integral equation; and solving the target integral equation by the bisection method, to determine the homogenization concentration corresponding to the actually measured signal value.

5. The method according to claim 3, wherein before determining the arc length equation of the fourth target arc line segment based on the arc length calculation formula and the length relationship, the method further comprises:

determining a step value of the compound Simpson integral formula according to the first end point of the first standard curve, the second end point of the first standard curve, the end point corresponding to the test sample on the first standard curve, the first end point of the second standard curve, and the second end point of the second standard curve.

6. The method according to claim 2, wherein before determining the arc length equation of the fourth target arc line segment based on the arc length calculation formula and the length relationship, the method further comprises:

determining a step value of the compound Simpson integral formula according to the first end point of the first standard curve, the second end point of the first standard curve, the end point corresponding to the test sample on the first standard curve, the first end point of the second standard curve, and the second end point of the second standard curve.

7. The method according to claim 2, wherein before acquiring the actually measured signal, the method further comprises determining number of comparison samples through steps of:

determining a plurality of first comparison samples corresponding to the test equipment according to the first standard curve and a preset error condition, wherein the first standard curve is used to characterize relationship between the signal value of the test equipment and the concentration, and the signal value comprises absorbance and luminescence value;

determining a plurality of second comparison samples corresponding to the reference equipment according to the second standard curve and the preset error condition, wherein the second standard curve is used to characterize relationship between the signal value of the reference equipment and the concentration, and the signal value comprises absorbance and luminescence value; and determining a plurality of final comparison samples according to the plurality of first comparison samples and the plurality of second comparison samples.

8. The method according to claim 1, wherein after determining the homogenization concentration corresponding to the actually measured signal value according to the arc length equation of the fourth target arc line segment, the method further comprises:

judging whether a difference between the homogenization concentration and the concentration at the first end point or the second end point of the second standard curve is less than a preset threshold, and calibrating, if yes, the homogenization concentration according to a formula:

$$x_E^{B''} = \frac{x_{j-1}^B - x_{E'}^B}{2} \text{ or } x_E^{B''} = \frac{-x_j^B + x_{E'}^B}{2},$$

wherein $$x_E^{B''}$$

is the homogenization concentration after calibration, $$x_j^B$$

is the concentration at the first end point of the second target arc line segment, $$x_{j-1}^B$$

is the concentration at the second end point of the second target arc line segment, and $$x_{E'}^B$$

is the homogenization concentration.

9. The method according to claim 1, wherein the determining a plurality of first comparison samples corresponding to the test equipment according to the first standard curve and a preset error condition comprises:

acquiring a lowest concentration value detectable by the test equipment;

determining a starting coordinate point on the first standard curve according to the lowest concentration value detectable by the test equipment;

determining, as the first comparison samples, corresponding comparison samples calculated and obtained according to the starting coordinate point on the first standard curve;

determining a plurality of first coordinate points on the first standard curve based on the preset error condition and the starting coordinate point on the first standard curve, wherein on the first standard curve, difference between concentrations between two coordinate points with same signal value on a standard curve and a straight line between two adjacent first coordinate points satisfies the preset error condition, the preset error condition being $$\left| \frac{x_c - x_D}{x_c} \right| \le d,$$

wherein C is any coordinate point between two adjacent first coordinate points on the first standard curve, D is a coordinate point having the same signal value as this coordinate point and located on a line segment constituted by the two adjacent first coordinate points, $x_c$ is a concentration value of the coordinate point C, $x_D$ is a concentration value of the coordinate point D, and d is a preset error value; and determining all comparison samples corresponding to the plurality of first coordinate points as the first comparison samples.

10. The method according to claim 9, wherein the determining a plurality of first coordinate points on the first standard curve based on the preset error condition and the starting coordinate point on the first standard curve comprises:

determining the plurality of first coordinate points on the first standard curve through a preset matlab algorithm based on the preset error condition and the starting coordinate point on the first standard curve.

11. The method according to claim 9, wherein the comparison sample determination method further comprises:

acquiring a highest concentration value detectable by the test equipment as the starting coordinate point;

calculating and determining another coordinate point on the first standard curve according to the starting coordinate point of the highest concentration value detectable by the test equipment; and determining comparison samples corresponding to the plurality of another coordinate points as the first comparison samples.

12. The method according to claim 1, wherein the determining a plurality of second comparison samples corresponding to the reference equipment according to the second standard curve and the preset error condition comprises:

acquiring a lowest concentration value detectable by the reference equipment;

determining a starting coordinate point on the second standard curve according to the lowest concentration value detectable by the reference equipment;

determining, as the second comparison samples, corresponding comparison samples calculated and obtained in sequence according to the starting coordinate point on the second standard curve; and determining the plurality of second coordinate points on the second standard curve based on the preset error condition and the starting coordinate point on the second standard curve, wherein on the second standard curve, difference between concentrations of two coordinate points with a same signal value on a standard curve and a straight line between two adjacent second coordinate points satisfies the preset error condition, the preset error condition being $$\left| \frac{x_E - x_F}{x_E} \right| \leq d,$$

where E is any coordinate point between two adjacent first coordinate points on the second standard curve, F is a coordinate point having the same signal value as this coordinate point and located on a line segment constituted by the two adjacent second coordinate points, $x_E$ is a concentration value of the coordinate point E, $x_F$ is a concentration value of the coordinate point F, and d is a preset error value; and determining all comparison samples corresponding to the plurality of second coordinate points as the second comparison samples.

13. The method according to claim 12, wherein the determining a plurality of second coordinate points on the second standard curve based on the preset error condition and the starting coordinate point on the second standard curve comprises:

determining the plurality of second coordinate points on the second standard curve by a preset matlab algorithm, based on the preset error condition and the starting coordinate point on the second standard curve.

14. The method according to claim 12, wherein the comparison sample determination method further comprises:

acquiring a highest concentration value detectable by the reference equipment as the starting coordinate point;

determining another coordinate point on the second standard curve according to the starting coordinate point of the highest concentration value detectable by the reference equipment; and determining a comparison sample of the another coordinate point on the second standard curve as the second comparison sample.

15. The method according to claim 1, wherein the determining a plurality of final comparison samples according to the plurality of first comparison samples and the plurality of second comparison samples comprises:

determining identical comparison samples in the plurality of first comparison samples and the plurality of comparison samples;

performing de-duplication on the identical comparison samples to obtain a plurality of de-duplicated comparison samples;

detecting the plurality of de-duplicated comparison samples by the test equipment or the reference equipment, to obtain detection curves corresponding to the plurality of de-duplicated comparison samples;

determining similar comparison samples according to the detection curves, wherein coordinate points of the similar comparison samples on the detection curves are adjacent coordinate points, and a concentration difference between the adjacent coordinate points is within a preset error range; and performing de-duplication on the similar comparison samples to obtain a plurality of final comparison samples.

16. Electronic equipment, comprising:

a processor; and a memory in communication with the processor, wherein the memory is configured to store instructions executable by the processor, and the instructions, when being executed by the processor, cause the processor to execute the index homogenization conversion method according to claim 1.

* * * * *